US010013988B2

(12) United States Patent
Lecomte et al.

(10) Patent No.: US 10,013,988 B2
(45) Date of Patent: Jul. 3, 2018

(54) APPARATUS AND METHOD FOR IMPROVED CONCEALMENT OF THE ADAPTIVE CODEBOOK IN A CELP-LIKE CONCEALMENT EMPLOYING IMPROVED PULSE RESYNCHRONIZATION

(71) Applicant: Fraunhofer-Gesellschaft zur Foerderung der angewandten Forschung e.V., Munich (DE)

(72) Inventors: Jeremie Lecomte, Fuerth (DE); Michael Schnabel, Geroldsgruen (DE); Goran Markovic, Nuremberg (DE); Martin Dietz, Nuremberg (DE); Bernhard Neugebauer, Erlangen (DE)

(73) Assignee: Fraunhofer-Gesellschaft zur Foerderung der angewandten Forschung e.V. (DE)

( * ) Notice: Subject to any disclaimer, the term of this patent is extended or adjusted under 35 U.S.C. 154(b) by 0 days.

(21) Appl. No.: 14/977,195

(22) Filed: Dec. 21, 2015

(65) Prior Publication Data

US 2016/0111094 A1 Apr. 21, 2016

Related U.S. Application Data

(63) Continuation of application No. PCT/EP2014/062578, filed on Jun. 16, 2014.

(30) Foreign Application Priority Data

Jun. 21, 2013 (EP) .................................... 13173157
May 5, 2014 (EP) .................................... 14166995

(51) Int. Cl.
*G10L 19/00* (2013.01)
*G10L 15/00* (2013.01)
(Continued)

(52) U.S. Cl.
CPC ............ *G10L 19/005* (2013.01); *G10L 19/12* (2013.01); *G10L 19/08* (2013.01); *G10L 19/107* (2013.01);
(Continued)

(58) Field of Classification Search
None
See application file for complete search history.

(56) References Cited

U.S. PATENT DOCUMENTS 5,179,594 A 1/1993 Yip et al.
5,187,745 A 2/1993 Yip et al.
(Continued)

FOREIGN PATENT DOCUMENTS

EP 2002427 B1 3/2011
JP 2009003387 A 1/2009

OTHER PUBLICATIONS

Anderson et al., "Pitch resynchronization while recovering from a late frame in a predictive speech decoder." Interspeech, Sep. 17-24, 2006, pp. 245-248, Section 1.3, Section 2.3, Figure 3.
(Continued)

*Primary Examiner* — Fariba Sirjani
(74) *Attorney, Agent, or Firm* — Haynes and Boone, LLP

(57) ABSTRACT

An apparatus for reconstructing a frame including a speech signal as a reconstructed frame is provided, the apparatus including a determination unit and a frame reconstructor being configured to reconstruct the reconstructed frame, such that the reconstructed frame completely or partially includes the first reconstructed pitch cycle, such that the reconstructed frame completely or partially includes a second reconstructed pitch cycle, and such that the number of samples of the first reconstructed pitch cycle differs from a number of samples of the second reconstructed pitch cycle.

12 Claims, 15 Drawing Sheets

(51) Int. Cl.

| | |
|---|---|
| ***G10L 19/005*** | (2013.01) |
| ***G10L 19/12*** | (2013.01) |
| *G10L 19/107* | (2013.01) |
| *G10L 19/08* | (2013.01) |

(52) U.S. Cl.

CPC ................. *G10L 2019/0002* (2013.01); *G10L 2019/0008* (2013.01)

(56) References Cited

U.S. PATENT DOCUMENTS

| | | | | |
|---|---|---|---|---|
| 5,621,853 | A * | 4/1997 | Gardner | G10L 19/12 704/201 |
| 5,657,419 | A * | 8/1997 | Yoo | G10L 19/08 704/221 |
| 6,035,271 | A * | 3/2000 | Chen | G10L 15/142 704/207 |
| 6,507,814 | B1 * | 1/2003 | Gao | G10L 19/005 704/219 |
| 8,255,207 | B2 * | 8/2012 | Vaillancourt | G10L 19/005 375/240.27 |
| 2007/0219788 | A1 * | 9/2007 | Gao | G10L 19/005 704/219 |
| 2009/0232228 | A1 * | 9/2009 | Thyssen | G10L 19/005 375/242 |
| 2012/0072209 | A1 * | 3/2012 | Krishnan | G10L 25/90 704/207 |
| 2012/0239389 | A1 | 9/2012 | Jeon et al. | |
| 2013/0041657 | A1 * | 2/2013 | Bradley | G10L 25/90 704/207 |
| 2015/0255079 | A1 * | 9/2015 | Huang | G10L 19/005 704/500 |
| 2016/0111094 | A1 | 4/2016 | Lecomte et al. | |
| 2016/0118053 | A1 | 4/2016 | Lecomte et al. | |

OTHER PUBLICATIONS

Written Opinion dated Jun. 8, 2016 issued in related pending Singapore Patent App. No. 11201510506R (7 pages).

Chibani et al.; Fast Recovery for a CELP-Like Speech Codec After a Frame Erasure, IEEE Transactions on Audio, Speech, and Language Processing, Nov. 2007; 15(8):2485-2495.

International Search Report in related PCT Application No. PCT/EP2014/062578 dated Aug. 7, 2014 (5 pages).

International Telecommunication Union; "G.729-based embedded variable bit-rate coder: An 8-32 kbit/s scalable wideband coder bitstream interoperable with G.729," ITU-T, G.729.1, May 2006.

International Telecommunication Union; "Frame error robust narrow-band and wideband embedded variable bit-rate coding of speech and audio from 8-32 kbit/s," ITU-T, G.718, Jun. 2008.

3GPP; "3rd Generation Partnership Project; Technical Specification Group Services and System Aspects; Audio codec processing functions; Extended Adaptive Multi-Rage-Wideband (AMR-WB+) codec; Transcoding functions (Release 11)," 3GPP TS 26.290 V11.0.0; Sep. 2012.

3GPP; "3rd Generation Partnership Project; Technical Specification Group Services and System Aspects; Mandatory Speech Codec speech processing functions; Adaptive Multi-Rate (AMR) speech codec; Error concealment of lost frames (Release 11)," 3GPP TS 26.091 V11.0.0; Sep. 2012.

3GPP; "3rd Generation Partnership Project; Technical Specification Group Services and System Aspects; Speech Codec speech processing functions; Adaptive Multi-Rate-Wideband (AMR-WB) speech codec; Error concealment of erroneous or lost frames (Release 12)," 3GPP TS 26.191 V12.0.0; Sep. 2014 (Sep. 2012 version as mentioned in specification is not available).

ITU-T; "G.719—Low-complexity, full-band audio coding for high-quality, conversational applications," Series G: Transmission Systems and Media, Digital Systems and Networks / Digital terminal equipments—Coding of analogue signals; Jun. 2008.

ITU-T; "G.722—7 kHz audio-coding within 64 kbit/s—Appendix III: A high-quality packet loss concealment algorithm for G.722," Series G: Transmission Systems and Media, Digital Systems and Networks / Digital terminal equipments—Coding of analogue signals by methods other than PCM; Nov. 2006.

ITU-T; "G.722—7 kHz audio-coding within 64 kbit/s—Appendix IV: A low-complexity algorithm for packet-loss concealment with ITU-T G.722," Series G: Transmission Systems and Media, Digital Systems and Networks / Digital terminal equipments—Coding of voice and audio signals; Nov. 2009 (Aug. 2007 version as mentioned in the specification is not available).

ITU-T; "G.722.2—Wideband coding of speech at around 16 kbit/s using Adaptive Multi-Rate Wideband (AMR-WB)," Series G: Transmission Systems and Media, Digital Systems and Networks / Digital terminal equipments—Coding of analogue signals by methods other than PCM; Jul. 2003.

ITU-T; "G.729—Coding of speech at 8 kbit/s using conjugate-structure algebraic-code-excited linear prediction (CS-ACELP)," Series G: Transmission Systems and Media, Digital Systems and Networks / Digital terminal equipments—Coding of voice and audio signals; Jun. 2012.

Marques et al.; "Improved Pitch Prediction With Fractional Delays in CELP Coding," 1990 International Conference on Acoustics, Speech, and Signal Processing, 1990; vol. 2; pp. 665-668.

Mu et al.; "A Frame Erasure Concealment Method Based on Pitch and Gain Linear Prediction for AMR-WB Codec," 2011 IEEE International Conference on Consumer Electronics (ICCE), Jan. 9, 2011; pp. 815-816.

Office Action issued in parallel Japanese patent application No. 2016-520421 dated May 2, 2017 (8 pages).

Office Action issued in related U.S. Appl. No. 14/977,224 dated Jun. 14, 2017 (45 pages).

Decision to Grant dated May 2, 2017 in the parallel Japanese patent application No. 2016-520420.

Office Action dated Apr. 20, 2017 in the parallel Russian application No. 2016101601.

Office Action dated Apr. 21, 2017 in the parallel Russian application No. 2016101599.

Office Action issued in related Korean patent application No. 10-2016-7001881 dated Jan. 16, 2018 (8 pages with English translations).

ITU-T Telecommunication Standardization Sector of ITU, G.729.1 (May 2006). G.729-based embedded variable bit-rate coder: An 8-32 kbit/s scalable wideband coder bitstream interoperable with G.729. Geneva, Switzerland 2007 (100 pages).

* cited by examiner

APPARATUS AND METHOD FOR IMPROVED CONCEALMENT OF THE ADAPTIVE CODEBOOK IN A CELP-LIKE CONCEALMENT EMPLOYING IMPROVED PULSE RESYNCHRONIZATION

CROSS-REFERENCE TO RELATED APPLICATIONS

This application is a continuation of copending International Application No. PCT/EP2014/062578, filed Jun. 16, 2014, which is incorporated herein by reference in its entirety, and additionally claims priority from European Applications No. EP 13173157, filed Jun. 21, 2013, and EP 14166995, filed May 5, 2014, which are all incorporated herein by reference in their entirety.

BACKGROUND OF THE INVENTION

The present invention relates to audio signal processing, in particular to speech processing, and, more particularly, to an apparatus and a method for improved concealment of the adaptive codebook in ACELP-like concealment (ACELP=Algebraic Code Excited Linear Prediction).

Audio signal processing becomes more and more important. In the field of audio signal processing, concealment techniques play an important role. When a frame gets lost or is corrupted, the lost information from the lost or corrupted frame has to be replaced. In speech signal processing, in particular, when considering ACELP- or ACELP-like-speech codecs, pitch information is very important. Pitch prediction techniques and pulse resynchronization techniques are needed.

Regarding pitch reconstruction, different pitch extrapolation techniques exist in conventional technology.

One of these techniques is a repetition based technique. Most of the state of the art codecs apply a simple repetition based concealment approach, which means that the last correctly received pitch period before the packet loss is repeated, until a good frame arrives and new pitch information can be decoded from the bitstream. Or, a pitch stability logic is applied according to which a pitch value is chosen which has been received some more time before the packet loss. Codecs following the repetition based approach are, for example, G.719 (see G.719: Low-complexity, full-band audio coding for high-quality, conversational applications, Recommendation ITU-T G.719, *Telecommunication Standardization Sector of ITU*, June 2008, 8.6), G.729 (see G.729: Coding of speech at 8 kbit/s using conjugate-structure algebraic-code-excited linear prediction (cs-acelp), Recommendation ITU-T G.729, *Telecommunication Standardization Sector of ITU*, June 2012, 4.4), AMR (see [Adaptive multi-rate (AMR) speech codec; error concealment of lost frames (release 11), 3GPP TS 26.091, *3rd Generation Partnership Project*, September 2012, 6.2.3.1], [ITU-T, Wideband coding of speech at around 16 kbit/s using adaptive multi-rate wideband (amr-wb), Recommendation ITU-T G.722.2, *Telecommunication Standardization Sector of ITU*, July 2003]), AMR-WB (see [Speech codec speech processing functions; adaptive multi-rate-wideband (AMRWB) speech codec; error concealment of erroneous or lost frames, 3GPP TS 26.191, *3rd Generation Partnership Project*, September 2012, 6.2.3.4.2]) and AMR-WB+ (ACELP and TCX20 (ACELP like) concealment) (see 3GPP; Technical Specification Group Services and System Aspects, Extended adaptive multi-rate-wideband (AMR-WB+) codec, 3GPP TS 26.290, *3rd Generation Partnership Project*, 2009); (AMR=Adaptive Multi-Rate; AMR-WB=Adaptive Multi-Rate-Wideband).

Another pitch reconstruction technique of conventional technology is pitch derivation from time domain. For some codecs, the pitch is necessitated for concealment, but not embedded in the bitstream. Therefore, the pitch is calculated based on the time domain signal of the previous frame in order to calculate the pitch period, which is then kept constant during concealment. A codec following this approach is, for example, G.722, see, in particular G.722 Appendix 3 (see [G.722 Appendix III: A high-complexity algorithm for packet loss concealment for G.722, *ITU-T Recommendation*, ITU-T, November 2006, III.6.6 and III.6.7]) and G.722 Appendix 4 (see G.722 Appendix IV: A low-complexity algorithm for packet loss concealment with G.722, *ITU-T Recommendation*, ITU-T, August 2007, IV.6.1.2.5).

A further pitch reconstruction technique of conventional technology is extrapolation based. Some state of the art codecs apply pitch extrapolation approaches and execute specific algorithms to change the pitch accordingly to the extrapolated pitch estimates during the packet loss. These approaches will be described in more detail as follows with reference to G.718 and G.729.1.

At first, G.718 considered (see G.718: Frame error robust narrow-band and wideband embedded variable bit-rate coding of speech and audio from 8-32 kbit/s, Recommendation ITU-T G.718, *Telecommunication Standardization Sector of ITU*, June 2008). An estimation of the future pitch is conducted by extrapolation to support the glottal pulse resynchronization module. This information on the possible future pitch value is used to synchronize the glottal pulses of the concealed excitation.

The pitch extrapolation is conducted only if the last good frame was not UNVOICED. The pitch extrapolation of G.718 is based on the assumption that the encoder has a smooth pitch contour. Said extrapolation is conducted based on the pitch lags $d_{fr}^{[i]}$ of the last seven subframes before the erasure.

In G.718, a history update of the floating pitch values is conducted after every correctly received frame. For this purpose, the pitch values are updated only if the core mode is other than UNVOICED. In the case of a lost frame, the difference $\Delta_{dfr}^{[i]}$ between the floating pitch lags is computed according to the formula $$\Delta_{dfr}^{[i]}=d_{fr}^{[i]}-d_{fr}^{[i-1]} \text{ for } i=-1, \ldots ,-6 \tag{1}$$

In formula (1), $d_{fr}^{[-1]}$ denotes the pitch lag of the last (i.e. $4^{th}$) subframe of the previous frame; $d_{fr}^{[-2]}$ denotes the pitch lag of the $3^{rd}$ subframe of the previous frame; etc.

According to G.718, the sum of the differences $\Delta_{dfr}^{[i]}$ is computed as $$s_\Delta = \sum_{i=-1}^{-6} \Delta_{dfr}^{[i]} \tag{2}$$

As the values $\Delta_{dfr}^{[i]}$ can be positive or negative, the number of sign inversions of $\Delta_{dfr}^{[i]}$ is summed and the position of the first inversion is indicated by a parameter being kept in memory.

The parameter $f_{corr}$ is found by $$f_{corr} = 1 - \frac{\sqrt{\sum_{i=-1}^{-6} (\Delta_{dfr}^{[-i]} - s_\Delta)^2}}{6 \cdot d_{max}} \tag{3}$$

wherein $d_{max}=231$ is the maximum considered pitch lag.

In G.718, a position $i_{max}$, indicating the maximum absolute difference is found according to the definition $$i_{max}\{\max_{i=-1}^{-6}(abs(\Delta_{dfr}^{[i]})))\}$$

and a ratio for this maximum difference is computed as follows:

$$r_{max} = \left| \frac{5 \cdot \Delta_{dfr}^{[i_{max}]}}{(s_\Delta - \Delta_{dfr}^{[i_{max}]})} \right| \tag{4}$$

If this ratio is greater than or equal to 5, then the pitch of the $4^{th}$ subframe of the last correctly received frame is used for all subframes to be concealed. If this ratio is greater than or equal to 5, this means that the algorithm is not sure enough to extrapolate the pitch, and the glottal pulse resynchronization will not be done.

If $r_{max}$ is less than 5, then additional processing is conducted to achieve the best possible extrapolation. Three different methods are used to extrapolate the future pitch. To choose between the possible pitch extrapolation algorithms, a deviation parameter $f_{corr2}$ is computed, which depends on the factor $f_{corr}$ and on the position of the maximum pitch variation $i_{max}$. However, at first, the mean floating pitch difference is modified to remove too large pitch differences from the mean.

If $f_{corr}<0.98$ and if $i_{max}=3$, then the mean fractional pitch difference $\overline{\Delta}_{dfr}$ is determined according to the formula:

$$\overline{\Delta}_{dfr} = \left( \frac{s_\Delta - \Delta_{dfr}^{[-4]} - \Delta_{dfr}^{[-5]}}{3} \right) \tag{5}$$

to remove the pitch differences related to the transition between two frames.

If $f_{corr} \geq 0.98$ or if $i_{max} \neq 3$, the mean fractional pitch difference $\overline{\Delta}_{dfr}$ is computed as $$\overline{\Delta}_{dfr} = \frac{s_\Delta - \Delta_{dfr}^{[i_{max}]}}{6} \tag{6}$$

and the maximum floating pitch difference is replaced with this new mean value $$\Delta_{dfr}^{[i_{max}]} = \overline{\Delta}_{dfr} \tag{7}$$

With this new mean of the floating pitch differences, the normalized deviation $f_{corr2}$ is computed as:

$$f_{corr2} = 1 - \frac{\sqrt{\sum_{i=-1}^{I_{sf}} (\Delta_{dfr}^{[i]} - \overline{\Delta}_{dfr})^2}}{I_{sf} \cdot d_{max}} \tag{8}$$

wherein $I_{sf}$ is equal to 4 in the first case and is equal to 6 in the second case.

Depending on this new parameter, a choice is made between the three methods of extrapolating the future pitch:

1. If $\Delta_{dfr}^{[i]}$ changes sign more than twice (this indicates a high pitch variation), the first sign inversion is in the last good frame (for i<3), and $f_{corr2}>0.945$, the extrapolated pitch, $d_{ext}$, (the extrapolated pitch is also denoted as $T_{ext}$) is computed as follows:

$$s_y = \sum_{i=-1}^{-4} \Delta_{dfr}^{[i]}$$

$$s_{xy} = \Delta_{dfr}^{[-2]} + 2 \cdot \Delta_{dfr}^{[-3]} + 3 \cdot \Delta_{dfr}^{[-4]}$$

$$d_{est} = \mathrm{round}\left[\Delta_{fr}^{[-1]} + \left( \frac{(7 \cdot s_y - 3 \cdot s_{xy})}{10} \right)\right].$$

2. If $0.945<f_{corr2}<0.99$ and $\Delta_{dfr}^{i}$ changes sign at least once, the weighted mean of the fractional pitch differences is employed to extrapolate the pitch. The weighting, $f_w$, of the mean difference is related to the normalized deviation, $f_{corr2}$, and the position of the first sign inversion is defined as follows:

$$f_w = f_{corr2} \cdot \left( \frac{i_{mem}}{7} \right)$$

The parameter $i_{mem}$ of the formula depends on the position of the first sign inversion of $\Delta_{dfr}^{i}$, such that $i_{mem}=0$ if the first sign inversion occurred between the last two subframes of the past frame, such that $i_{mem}=1$ if the first sign inversion occurred between the $2^{nd}$ and $3^{rd}$ subframes of the past frame, and so on. If the first sign inversion is close to the last frame end, this means that the pitch variation was less stable just before the lost frame. Thus the weighting factor applied to the mean will be close to 0 and the extrapolated pitch $d_{ext}$ will be close to the pitch of the $4^{th}$ subframe of the last good frame:

$$d_{ext} = \mathrm{round}[\Delta_{fr}^{[-1]} + 4 \cdot \overline{\Delta}_{dfr} \cdot f_w]$$

3. Otherwise, the pitch evolution is considered stable and the extrapolated pitch $d_{ext}$ is determined as follows:

$$d_{ext} = \mathrm{round}[d_{fr}^{[-1]} + 4 \cdot \overline{\Delta}_{dfr}].$$

After this processing, the pitch lag is limited between 34 and 231 (values denote the minimum and the maximum allowed pitch lags).

Now, to illustrate another example of extrapolation based pitch reconstruction techniques, G.729.1 is considered (see G.729.1: G.729-based embedded variable bit-rate coder: An 8-32 kbit/s scalable wideband coder bitstream interoperable with g.729, Recommendation ITU-T G.729.1, *Telecommunication Standardization Sector of ITU*, May 2006).

G.729.1 features a pitch extrapolation approach (see Yang Gao, Pitch prediction for packet loss concealment, European Patent 2 002 427 B1), in case that no forward error concealment information (e.g., phase information) is decodable. This happens, for example, if two consecutive frames get lost (one superframe consists of four frames which can be either ACELP or TCX20). There are also TCX40 or TCX80 frames possible and almost all combinations of it.

When one or more frames are lost in a voiced region, previous pitch information is used to reconstruct the current lost frame. The precision of the current estimated pitch may directly influence the phase alignment to the original signal, and it is critical for the reconstruction quality of the current lost frame and the received frame after the lost frame. Using several past pitch lags instead of just copying the previous pitch lag would result in statistically better pitch estimation. In the G.729.1 coder, pitch extrapolation for FEC (FEC=forward error correction) consists of linear extrapolation based on the past five pitch values. The past five pitch values are P(i), for i=0, 1, 2, 3, 4, wherein P(4) is the latest pitch value. The extrapolation model is defined according to:

$$P'(i)=a+i\cdot b \tag{9}$$

The extrapolated pitch value for the first subframe in a lost frame is then defined as:

$$P'(5)=a+5\cdot b \tag{9}$$

In order to determine the coefficients a and b, an error E is minimized, wherein the error E is defined according to:

$$E=\sum_{i=0}^{4}[P'(i)-P(i)]^2 = \sum_{i=0}^{4}[(a+b\cdot i)-P(i)]^2 \tag{11}$$

By setting $$\frac{\delta E}{\delta a}=0 \text{ and } \frac{\delta E}{\delta b}=0 \tag{12}$$

a and b result to:

$$a=\frac{3\sum_{i=0}^{4}P(i)-\sum_{i=0}^{4}i\cdot P(i)}{5} \text{ and } b=\frac{\sum_{i=0}^{4}i\cdot P(i)-2\sum_{i=0}^{4}P(i)}{10} \tag{13}$$

In the following, a frame erasure concealment concept of conventional technology for the AMR-WB codec as presented in Xinwen Mu, Hexin Chen, and Yan Zhao, A frame erasure concealment method based on pitch and gain linear prediction for AMR-WB codec, *Consumer Electronics* (*ICCE*), 2011 *IEEE International Conference* on, January 2011, pp. 815-816, is described. This frame erasure concealment concept is based on pitch and gain linear prediction. Said paper proposes a linear pitch inter/extrapolation approach in case of a frame loss, based on a Minimum Mean Square Error Criterion.

According to this frame erasure concealment concept, at the decoder, when the type of the last valid frame before the erased frame (the past frame) is the same as that of the earliest one after the erased frame (the future frame), the pitch P(i) is defined, where i=−N, −N+1, . . . , 0, 1, . . . , N+4, N+5, and where N is the number of past and future subframes of the erased frame. P(1), P(2), P(3), P(4) are the four pitches of four subframes in the erased frame, P(0), P(−1), . . . , P(−N) are the pitches of the past subframes, and P(5), P(6), . . . , P(N+5) are the pitches of the future subframes. A linear prediction model P'(i)=a+b i is employed. For i=1, 2, 3, 4; P'(1), P'(2), P'(3), P'(4) are the predicted pitches for the erased frame. The MMS Criterion (MMS=Minimum Mean Square) is taken into account to derive the values of two predicted coefficients a and b according to an interpolation approach. According to this approach, the error E is defined as:

$$E=\sum_{-N}^{0}[P'(i)-P(i)]^2+\sum_{5}^{N+5}[P'(i)-P(i)]^2 = \sum_{-N}^{0}[a+b\cdot i-P(i)]^2+\sum_{5}^{N+5}[a+b\cdot i-P(i)]^2 \tag{14a}$$

Then, the coefficients a and b can be obtained by calculating $$\frac{\delta E}{\delta a}=0 \text{ and } \frac{\delta E}{\delta b}=0 \tag{14b}$$

$$a=\frac{2\left[\sum_{i=-N}^{0}P(i)+\sum_{i=5}^{N+5}P(i)\right]\cdot(N^3+9N^2+38N+1)}{(N+1)\cdot(4N^3+36N^2+107N-1)} \tag{14c}$$

$$b=\frac{9\left[\sum_{i=-N}^{0}P(i)+\sum_{i=5}^{N+5}P(i)\right]}{1-107N-36N^2-4N^3} \tag{14d}$$

The pitch lags for the last four subframes of the erased frame can be calculated according to:

$$P'(1)=a+b\cdot 1;\ P'(2)=a+b\cdot 2$$

$$P'(3)=a+b\cdot 3;\ P'(4)=a+b\cdot 4 \tag{14e}$$

It is found that N=4 provides the best result. N=4 means that five past subframes and five future subframes are used for the interpolation.

However, when the type of the past frames is different from the type of the future frames, for example, when the past frame is voiced but the future frame is unvoiced, just the voiced pitches of the past or the future frames are used to predict the pitches of the erased frame using the above extrapolation approach.

Now, pulse resynchronization in conventional technology is considered, in particular with reference to G.718 and G.729.1. An approach for pulse resynchronization is described in Tommy Vaillancourt, Milan Jelinek, Philippe Gournay, and Redwan Salami, Method and device for efficient frame erasure concealment in speech codecs, U.S. Pat. No. 8,255,207 B2, 2012.

At first, constructing the periodic part of the excitation is described.

For a concealment of erased frames following a correctly received frame other than UNVOICED, the periodic part of the excitation is constructed by repeating the low pass filtered last pitch period of the previous frame.

The construction of the periodic part is done using a simple copy of a low pass filtered segment of the excitation signal from the end of the previous frame.

The pitch period length is rounded to the closest integer:

$$T_c=\text{round}(\text{last\_pitch}) \tag{15a}$$

Considering that the last pitch period length is $T_p$, then the length of the segment that is copied, $T_r$, may, e.g., be defined according to:

$$T_r=\lfloor T_p+0.5\rfloor \tag{15b}$$

The periodic part is constructed for one frame and one additional subframe.

For example, with M subframes in a frame, the subframe length is $$\text{L\_subfr} = \frac{L}{M},$$

wherein L is the frame length, also denoted as $L_{frame}$: $L=L_{frame}$L=L_frame.

FIG. 3 illustrates a constructed periodic part of a speech signal.

T [0] is the location of the first maximum pulse in the constructed periodic part of the excitation. The positions of the other pulses are given by:

$$T[i]=T[0]+i\ T_c \tag{16a}$$

corresponding to $$T[i]=T[0]+i\ T_r \tag{16b}$$

After the construction of the periodic part of the excitation, the glottal pulse resynchronization is performed to correct the difference between the estimated target position of the last pulse in the lost frame (P), and its actual position in the constructed periodic part of the excitation (T[k]).

The pitch lag evolution is extrapolated based on the pitch lags of the last seven subframes before the lost frame. The evolving pitch lags in each subframe are:

$$p[i]=\text{round}(T_c+(i+1)\delta),\ 0\le i<M \tag{17a}$$

where $$\delta = \frac{T_{ext} - T_c}{M} \tag{17b}$$

and $T_{ext}$ (also denoted as $d_{ext}$) is the extrapolated pitch as described above for $d_{ext}$.

The difference, denoted as d, between the sum of the total number of samples within pitch cycles with the constant pitch ($T_c$) and the sum of the total number of samples within pitch cycles with the evolving pitch, p[i], is found within a frame length. There is no description in the documentation how to find d.

In the source code of G.718 (see G.718: Frame error robust narrow-band and wideband embedded variable bit-rate coding of speech and audio from 8-32 kbit/s, Recommendation ITU-T G.718, *Telecommunication Standardization Sector of ITU*, June 2008), d is found using the following algorithm (where M is the number of subframes in a frame):

```
ftmp = p[0];
i = i;
while (ftmp < L_frame − pit_min) {
    sect = (short)(ftmp*M/L_frame);
    ftmp += p[sect];
    i++;
}
d = (short)(i*Tc − ftmp);
```

The number of pulses in the constructed periodic part within a frame length plus the first pulse in the future frame is N. There is no description in the documentation how to find N.

In the source code of G.718 (see G.718: Frame error robust narrow-band and wideband embedded variable bit-rate coding of speech and audio from 8-32 kbit/s, Recommendation ITU-T G.718, *Telecommunication Standardization Sector of ITU*, June 2008), N is found according to:

$$N = 1 + \left\lfloor \frac{\text{L\_frame}}{Tc} \right\rfloor \tag{18a}$$

The position of the last pulse T [n] in the constructed periodic part of the excitation that belongs to the lost frame is determined by:

$$n = \begin{cases} N-1, & T[N-1] < \text{L\_frame} \\ N-2, & T[N-1] \ge \text{L\_frame} \end{cases} \tag{18b}$$

The estimated last pulse position P is:

$$P=T[n']+d \tag{19a}$$

The actual position of the last pulse position T [k] is the position of the pulse in the constructed periodic part of the excitation (including in the search the first pulse after the current frame) closest to the estimated target position P:

$$\forall i\,|T[k]-P|\le|T[i]-P|,\ 0\le i<N \tag{19b}$$

The glottal pulse resynchronization is conducted by adding or removing samples in the minimum energy regions of the full pitch cycles. The number of samples to be added or removed is determined by the difference:

$$diff=P-T[k] \tag{19c}$$

The minimum energy regions are determined using a sliding 5-sample window. The minimum energy position is set at the middle of the window at which the energy is at a minimum. The search is performed between two pitch pulses from $T[i]+T_c/8$ to $T[i+1]-T_c/4$. There are $N_{min}$=n−1 minimum energy regions.

If $N_{min}$=1, then there is only one minimum energy region and dif f samples are inserted or deleted at that position.

For $N_{min}$>1, less samples are added or removed at the beginning and more towards the end of the frame. The number of samples to be removed or added between pulses T[i] and T[i+1] is found using the following recursive relation:

$$R[i] = \text{round}\left(\frac{(i+1)^2}{2} f - \sum_{k=0}^{i-1} R[k]\right) \text{ with } f = \frac{2\,|diff|}{N_{min}^2} \tag{19d}$$

If R[i]<R[i−1], then the values of R [i] and R[i−1] are interchanged.

SUMMARY

According to a first embodiment, an apparatus for reconstructing a frame including a speech signal as a reconstructed frame, said reconstructed frame being associated with one or more available frames, said one or more available frames being at least one of one or more preceding frames of the reconstructed frame and one or more succeeding frames of the reconstructed frame, wherein the one or more available frames include one or more pitch cycles as one or more available pitch cycles, may have: a determination unit for determining a sample number difference indicating a difference between a number of samples of one of the one or more available pitch cycles and a number of samples of a first pitch cycle to be reconstructed, and a frame reconstructor for reconstructing the reconstructed frame by reconstructing, depending on the sample number difference and depending on the samples of said one of the one or more available pitch cycles, the first pitch cycle to be reconstructed as a first reconstructed pitch cycle, wherein the frame reconstructor is configured to reconstruct the reconstructed frame, such that the reconstructed frame completely or partially includes the first reconstructed pitch cycle, such that the reconstructed frame completely or partially includes a second reconstructed pitch cycle, and such that the number of samples of the first reconstructed pitch cycle differs from a number of samples of the second reconstructed pitch cycle, wherein the frame reconstructor is adapted to generate an intermediate frame depending on said one of the one or more available pitch cycles, wherein the frame reconstructor is adapted to generate the intermediate frame so that the intermediate frame includes a first partial intermediate pitch cycle, one or more further intermediate pitch cycles, and a second partial intermediate pitch cycle, wherein the first partial intermediate pitch cycle depends on one or more of the samples of said one of the one or more available pitch cycles, wherein each of the one or more further intermediate pitch cycles depends on all of the samples of said one of the one or more available pitch cycles, and wherein the second partial intermediate pitch cycle depends on one or more of the samples of said one of the one or more available pitch cycles, wherein the determination unit is configured to determine a start portion difference number indicating how many samples are to be removed or added from the first partial intermediate pitch cycle, and wherein the frame reconstructor is configured to remove one or more first samples from the first partial intermediate pitch cycle, or is configured to add one or more first samples to the first partial intermediate pitch cycle depending on the start portion difference number, wherein the determination unit is configured to determine for each of the further intermediate pitch cycles a pitch cycle difference number indicating how many samples are to be removed or added from said one of the further intermediate pitch cycles, and wherein the frame reconstructor is configured to remove one or more second samples from said one of the further intermediate pitch cycles, or is configured to add one or more second samples to said one of the further intermediate pitch cycles depending on said pitch cycle difference number, and wherein the determination unit is configured to determine an end portion difference number indicating how many samples are to be removed or added from the second partial intermediate pitch cycle, and wherein the frame reconstructor is configured to remove one or more third samples from the second partial intermediate pitch cycle, or is configured to add one or more third samples to the second partial intermediate pitch cycle depending on the end portion difference number.

According to another embodiment, a method for reconstructing a frame including a speech signal as a reconstructed frame, said reconstructed frame being associated with one or more available frames, said one or more available frames being at least one of one or more preceding frames of the reconstructed frame and one or more succeeding frames of the reconstructed frame, wherein the one or more available frames include one or more pitch cycles as one or more available pitch cycles, may have the steps of: determining a sample number difference indicating a difference between a number of samples of one of the one or more available pitch cycles and a number of samples of a first pitch cycle to be reconstructed, and reconstructing the reconstructed frame by reconstructing, depending on the sample number difference and depending on the samples of said one of the one or more available pitch cycles, the first pitch cycle to be reconstructed as a first reconstructed pitch cycle, wherein reconstructing the reconstructed frame is conducted, such that the reconstructed frame completely or partially includes the first reconstructed pitch cycle, such that the reconstructed frame completely or partially includes a second reconstructed pitch cycle, and such that the number of samples of the first reconstructed pitch cycle differs from a number of samples of the second reconstructed pitch cycle, wherein the method further includes generating an intermediate frame depending on said one of the one or more available pitch cycles, wherein generating the intermediate frame is conducted so that the intermediate frame includes a first partial intermediate pitch cycle, one or more further intermediate pitch cycles, and a second partial intermediate pitch cycle, wherein the first partial intermediate pitch cycle depends on one or more of the samples of said one of the one or more available pitch cycles, wherein each of the one or more further intermediate pitch cycles depends on all of the samples of said one of the one or more available pitch cycles, and wherein the second partial intermediate pitch cycle depends on one or more of the samples of said one of the one or more available pitch cycles, wherein the method further includes determining a start portion difference number indicating how many samples are to be removed or added from the first partial intermediate pitch cycle, and wherein the method further includes removing one or more first samples from the first partial intermediate pitch cycle, or is configured to add one or more first samples to the first partial intermediate pitch cycle depending on the start portion difference number, wherein the method further includes determining for each of the further intermediate pitch cycles a pitch cycle difference number indicating how many samples are to be removed or added from said one of the further intermediate pitch cycles, and wherein the method further includes removing one or more second samples from said one of the further intermediate pitch cycles, or is configured to add one or more second samples to said one of the further intermediate pitch cycles depending on said pitch cycle difference number, and wherein the method further includes determining an end portion difference number indicating how many samples are to be removed or added from the second partial intermediate pitch cycle, and wherein the method further includes removing one or more third samples from the second partial intermediate pitch cycle, or is configured to add one or more third samples to the second partial intermediate pitch cycle depending on the end portion difference number.

Another embodiment may have a computer program for implementing the inventive method when being executed on a computer or signal processor.

An apparatus for reconstructing a frame comprising a speech signal as a reconstructed frame is provided, said reconstructed frame being associated with one or more available frames, said one or more available frames being at least one of one or more preceding frames of the reconstructed frame and one or more succeeding frames of the reconstructed frame, wherein the one or more available frames comprise one or more pitch cycles as one or more available pitch cycles. The apparatus comprises a determination unit for determining a sample number difference indicating a difference between a number of samples of one of the one or more available pitch cycles and a number of samples of a first pitch cycle to be reconstructed. Moreover, the apparatus comprises a frame reconstructor for reconstructing the reconstructed frame by reconstructing, depending on the sample number difference and depending on the samples of said one of the one or more available pitch cycles, the first pitch cycle to be reconstructed as a first reconstructed pitch cycle. The frame reconstructor is configured to reconstruct the reconstructed frame, such that the reconstructed frame completely or partially comprises the first reconstructed pitch cycle, such that the reconstructed frame completely or partially comprises a second reconstructed pitch cycle, and such that the number of samples of the first reconstructed pitch cycle differs from a number of samples of the second reconstructed pitch cycle.

According to an embodiment, the determination unit may, e.g., be configured to determine a sample number difference for each of a plurality of pitch cycles to be reconstructed, such that the sample number difference of each of the pitch cycles indicates a difference between the number of samples of said one of the one or more available pitch cycles and a number of samples of said pitch cycle to be reconstructed. The frame reconstructor may, e.g., be configured to reconstruct each pitch cycle of the plurality of pitch cycles to be reconstructed depending on the sample number difference of said pitch cycle to be reconstructed and depending on the samples of said one of the one or more available pitch cycles, to reconstruct the reconstructed frame.

In an embodiment, the frame reconstructor may, e.g., be configured to generate an intermediate frame depending on said one of the of the one or more available pitch cycles. The frame reconstructor may, e.g., be configured to modify the intermediate frame to obtain the reconstructed frame.

According to an embodiment, the determination unit may, e.g., be configured to determine a frame difference value (d; s) indicating how many samples are to be removed from the intermediate frame or how many samples are to be added to the intermediate frame. Moreover, the frame reconstructor may, e.g., be configured to remove first samples from the intermediate frame to obtain the reconstructed frame, when the frame difference value indicates that the first samples shall be removed from the frame. Furthermore, the frame reconstructor may, e.g., be configured to add second samples to the intermediate frame to obtain the reconstructed frame, when the frame difference value (d; s) indicates that the second samples shall be added to the frame.

In an embodiment, the frame reconstructor may, e.g., be configured to remove the first samples from the intermediate frame when the frame difference value indicates that the first samples shall be removed from the frame, so that the number of first samples that are removed from the intermediate frame is indicated by the frame difference value. Moreover, the frame reconstructor may, e.g., be configured to add the second samples to the intermediate frame when the frame difference value indicates that the second samples shall be added to the frame, so that the number of second samples that are added to the intermediate frame is indicated by the frame difference value.

According to an embodiment, the determination unit may, e.g., be configured to determine the frame difference number s so that the formula:

$$s = \sum_{i=0}^{M-1} (p[i] - T_r) \frac{L}{MT_r}$$

holds true, wherein L indicates a number of samples of the reconstructed frame, wherein M indicates a number of subframes of the reconstructed frame, wherein $T_r$ indicates a rounded pitch period length of said one of the one or more available pitch cycles, and wherein p[i] indicates a pitch period length of a reconstructed pitch cycle of the i-th subframe of the reconstructed frame.

In an embodiment, the frame reconstructor may, e.g., be adapted to generate an intermediate frame depending on said one of the one or more available pitch cycles. Moreover, the frame reconstructor may, e.g., be adapted to generate the intermediate frame so that the intermediate frame comprises a first partial intermediate pitch cycle, one or more further intermediate pitch cycles, and a second partial intermediate pitch cycle. Furthermore, the first partial intermediate pitch cycle may, e.g., depend on one or more of the samples of said one of the one or more available pitch cycles, wherein each of the one or more further intermediate pitch cycles depends on all of the samples of said one of the one or more available pitch cycles, and wherein the second partial intermediate pitch cycle depends on one or more of the samples of said one of the one or more available pitch cycles. Moreover, the determination unit may, e.g., be configured to determine a start portion difference number indicating how many samples are to be removed or added from the first partial intermediate pitch cycle, and wherein the frame reconstructor is configured to remove one or more first samples from the first partial intermediate pitch cycle, or is configured to add one or more first samples to the first partial intermediate pitch cycle depending on the start portion difference number. Furthermore, the determination unit may, e.g., be configured to determine for each of the further intermediate pitch cycles a pitch cycle difference number indicating how many samples are to be removed or added from said one of the further intermediate pitch cycles. Moreover, the frame reconstructor may, e.g., be configured to remove one or more second samples from said one of the further intermediate pitch cycles, or is configured to add one or more second samples to said one of the further intermediate pitch cycles depending on said pitch cycle difference number. Furthermore, the determination unit may, e.g., be configured to determine an end portion difference number indicating how many samples are to be removed or added from the second partial intermediate pitch cycle, and wherein the frame reconstructor is configured to remove one or more third samples from the second partial intermediate pitch cycle, or is configured to add one or more third samples to the second partial intermediate pitch cycle depending on the end portion difference number.

According to an embodiment, the frame reconstructor may, e.g., be configured to generate an intermediate frame depending on said one of the of the one or more available pitch cycles. Moreover, the determination unit may, e.g., be adapted to determine one or more low energy signal portions of the speech signal comprised by the intermediate frame, wherein each of the one or more low energy signal portions is a first signal portion of the speech signal within the intermediate frame, where the energy of the speech signal is lower than in a second signal portion of the speech signal comprised by the intermediate frame. Furthermore, the frame reconstructor may, e.g., be configured to remove one or more samples from at least one of the one or more low energy signal portions of the speech signal, or to add one or more samples to at least one of the one or more low energy signal portions of the speech signal, to obtain the reconstructed frame.

In a particular embodiment, the frame reconstructor may, e.g., be configured to generate the intermediate frame, such that the intermediate frame comprises one or more reconstructed pitch cycles, such that each of the one or more reconstructed pitch cycles depends on said one of the of the one or more available pitch cycles. Moreover, the determination unit may, e.g., be configured to determine a number of samples that shall be removed from each of the one or more reconstructed pitch cycles. Furthermore, the determination unit may, e.g., be configured to determine each of the one or more low energy signal portions such that for each of the one or more low energy signal portions a number of samples of said low energy signal portion depends on the number of samples that shall be removed from one of the one or more reconstructed pitch cycles, wherein said low energy signal portion is located within said one of the one or more reconstructed pitch cycles.

In an embodiment, the determination unit may, e.g., be configured to determine a position of one or more pulses of the speech signal of the frame to be reconstructed as reconstructed frame. Moreover, the frame reconstructor may, e.g., be configured to reconstruct the reconstructed frame depending on the position of the one or more pulses of the speech signal.

According to an embodiment, the determination unit may, e.g., be configured to determine a position of two or more pulses of the speech signal of the frame to be reconstructed as reconstructed frame, wherein T [0] is the position of one of the two or more pulses of the speech signal of the frame to be reconstructed as reconstructed frame, and wherein the determination unit is configured to determine the position (T [i]) of further pulses of the two or more pulses of the speech signal according to the formula:

$$T[i]=T[0]+i\ T_r$$

wherein $T_r$ indicates a rounded length of said one of the one or more available pitch cycles, and wherein i is an integer.

According to an embodiment, the determination unit may, e.g., be configured to determine an index k of the last pulse of the speech signal of the frame to be reconstructed as the reconstructed frame such that $$k = \left\lceil \frac{L - s - T[0]}{T_r} - 1 \right\rceil,$$

wherein L indicates a number of samples of the reconstructed frame, wherein s indicates the frame difference value, wherein T [0] indicates a position of a pulse of the speech signal of the frame to be reconstructed as the reconstructed frame, being different from the last pulse of the speech signal, and wherein $T_r$ indicates a rounded length of said one of the one or more available pitch cycles.

In an embodiment, the determination unit may, e.g., be configured to reconstruct the frame to be reconstructed as the reconstructed frame by determining a parameter δ, wherein δ is defined according to the formula:

$$\delta = \frac{T_{\exp} - T_p}{M}$$

wherein the frame to be reconstructed as the reconstructed frame comprises M subframes, wherein $T_p$ indicates the length of said one of the one or more available pitch cycles, and wherein $T_{ext}$ $T_{ext}$ indicates a length of one of the pitch cycles to be reconstructed of the frame to be reconstructed as the reconstructed frame.

According to an embodiment, the determination unit may, e.g., be configured to reconstruct the reconstructed frame by determining a rounded length $T_r$ of said one of the one or more available pitch cycles based on formula:

$$T_r = \lfloor T_p + 0.5 \rfloor$$

wherein $T_p$ indicates the length of said one of the one or more available pitch cycles.

In an embodiment, the determination unit may, e.g., be configured to reconstruct the reconstructed frame by applying the formula:

$$s = \delta \frac{L}{T_r} \frac{M+1}{2} - L\left(1 - \frac{T_p}{T_r}\right)$$

wherein $T_p$ indicates the length of said one of the one or more available pitch cycles, wherein $T_r$ indicates a rounded length of said one of the one or more available pitch cycles, wherein the frame to be reconstructed as the reconstructed frame comprises M subframes, wherein the frame to be reconstructed as the reconstructed frame comprises L samples, and wherein δ is a real number indicating a difference between a number of samples of said one of the one or more available pitch cycles and a number of samples of one of one or more pitch cycles to be reconstructed.

Moreover, a method for reconstructing a frame comprising a speech signal as a reconstructed frame is provided, said reconstructed frame being associated with one or more available frames, said one or more available frames being at least one of one or more preceding frames of the reconstructed frame and one or more succeeding frames of the reconstructed frame, wherein the one or more available frames comprise one or more pitch cycles as one or more available pitch cycles. The method comprises:

Determining a sample number difference ($\Delta_0^P;\Delta_i;\Delta_{k+1}^P$) indicating a difference between a number of samples of one of the one or more available pitch cycles and a number of samples of a first pitch cycle to be reconstructed; and Reconstructing the reconstructed frame by reconstructing, depending on the sample number difference ($\Delta_0^P;\Delta_i;\Delta_{k+1}^P$) and depending on the samples of said one of the one or more available pitch cycles, the first pitch cycle to be reconstructed as a first reconstructed pitch cycle.

Reconstructing the reconstructed frame is conducted, such that the reconstructed frame completely or partially comprises the first reconstructed pitch cycle, such that the reconstructed frame completely or partially comprises a second reconstructed pitch cycle, and such that the number of samples of the first reconstructed pitch cycle differs from a number of samples of the second reconstructed pitch cycle.

Furthermore, a computer program for implementing the above-described method when being executed on a computer or signal processor is provided.

Moreover, an apparatus for determining an estimated pitch lag is provided. The apparatus comprises an input interface for receiving a plurality of original pitch lag values, and a pitch lag estimator for estimating the estimated pitch lag. The pitch lag estimator is configured to estimate the estimated pitch lag depending on a plurality of original pitch lag values and depending on a plurality of information values, wherein for each original pitch lag value of the plurality of original pitch lag values, an information value of the plurality of information values is assigned to said original pitch lag value.

According to an embodiment, the pitch lag estimator may, e.g., be configured to estimate the estimated pitch lag depending on the plurality of original pitch lag values and depending on a plurality of pitch gain values as the plurality of information values, wherein for each original pitch lag value of the plurality of original pitch lag values, a pitch gain value of the plurality of pitch gain values is assigned to said original pitch lag value.

In a particular embodiment, each of the plurality of pitch gain values may, e.g., be an adaptive codebook gain.

In an embodiment, the pitch lag estimator may, e.g., be configured to estimate the estimated pitch lag by minimizing an error function.

According to an embodiment, the pitch lag estimator may, e.g., be configured to estimate the estimated pitch lag by determining two parameters a, b, by minimizing the error function $$err = \sum_{i=0}^{k} g_p(i) \cdot ((a + b \cdot i) - P(i))^2,$$

wherein a is a real number, wherein b is a real number, wherein k is an integer with k≥2, and wherein P(i) is the i-th original pitch lag value, wherein $g_p(i)$ is the i-th pitch gain value being assigned to the i-th pitch lag value P(i).

In an embodiment, the pitch lag estimator may, e.g., be configured to estimate the estimated pitch lag by determining two parameters a, b, by minimizing the error function $$err = \sum_{i=0}^{4} g_p(i) \cdot ((a + b \cdot i) - P(i))^2,$$

wherein a is a real number, wherein b is a real number, wherein P(i) is the i-th original pitch lag value, wherein $g_p(i)$ is the i-th pitch gain value being assigned to the i-th pitch lag value P(i).

According to an embodiment, the pitch lag estimator may, e.g., be configured to determine the estimated pitch lag p according to p=a·i+b.

In an embodiment, the pitch lag estimator may, e.g., be configured to estimate the estimated pitch lag depending on the plurality of original pitch lag values and depending on a plurality of time values as the plurality of information values, wherein for each original pitch lag value of the plurality of original pitch lag values, a time value of the plurality of time values is assigned to said original pitch lag value.

According to an embodiment, the pitch lag estimator may, e.g., be configured to estimate the estimated pitch lag by minimizing an error function.

In an embodiment, the pitch lag estimator may, e.g., be configured to estimate the estimated pitch lag by determining two parameters a, b, by minimizing the error function $$err = \sum_{i=0}^{k} \text{time}_{passed}(i) \cdot ((a + b \cdot i) - P(i))^2,$$

wherein a is a real number, wherein b is a real number, wherein k is an integer with k≥2, and wherein P(i) is the i-th original pitch lag value, wherein $\text{time}_{passed}(i)$ is the i-th time value being assigned to the i-th pitch lag value P(i).

According to an embodiment, the pitch lag estimator may, e.g., be configured to estimate the estimated pitch lag by determining two parameters a, b, by minimizing the error function $$err = \sum_{i=0}^{4} \text{time}_{passed}(i) \cdot ((a + b \cdot i) - P(i))^2,$$

wherein a is a real number, wherein b is a real number, wherein P(i) is the i-th original pitch lag value, wherein $\text{time}_{passed}(i)$ is the i-th time value being assigned to the i-th pitch lag value P(i).

In an embodiment, the pitch lag estimator is configured to determine the estimated pitch lag p according to p=a·i+b.

Moreover, a method for determining an estimated pitch lag is provided. The method comprises:

Receiving a plurality of original pitch lag values; and

Estimating the estimated pitch lag.

Estimating the estimated pitch lag is conducted depending on a plurality of original pitch lag values and depending on a plurality of information values, wherein for each original pitch lag value of the plurality of original pitch lag values, an information value of the plurality of information values is assigned to said original pitch lag value.

Furthermore, a computer program for implementing the above-described method when being executed on a computer or signal processor is provided.

Moreover, a system for reconstructing a frame comprising a speech signal is provided. The system comprises an apparatus for determining an estimated pitch lag according to one of the above-described or below-described embodiments, and an apparatus for reconstructing the frame, wherein the apparatus for reconstructing the frame is configured to reconstruct the frame depending on the estimated pitch lag. The estimated pitch lag is a pitch lag of the speech signal.

In an embodiment, the reconstructed frame may, e.g., be associated with one or more available frames, said one or more available frames being at least one of one or more preceding frames of the reconstructed frame and one or more succeeding frames of the reconstructed frame, wherein the one or more available frames comprise one or more pitch cycles as one or more available pitch cycles. The apparatus for reconstructing the frame may, e.g., be an apparatus for reconstructing a frame according to one of the above-described or below-described embodiments.

The present invention is based on the finding that conventional technology has significant drawbacks. Both G.718 (see G.718: Frame error robust narrow-band and wideband embedded variable bit-rate coding of speech and audio from 8-32 kbit/s, Recommendation ITU-T G.718, *Telecommunication Standardization Sector of ITU*, June 2008) and G.729.1 (see G.729.1: G.729-based embedded variable bit-rate coder: An 8-32 kbit/s scalable wideband coder bitstream interoperable with g.729, Recommendation ITU-T G.729.1, *Telecommunication Standardization Sector of ITU*, May 2006) use pitch extrapolation in case of a frame loss. This is necessitated, because in case of a frame loss, also the pitch lags are lost. According to G.718 and G.729.1, the pitch is extrapolated by taking the pitch evolution during the last two frames into account. However, the pitch lag being reconstructed by G.718 and G.729.1 is not very accurate and, e.g., often results in a reconstructed pitch lag that differs significantly from the real pitch lag.

Embodiments of the present invention provide a more accurate pitch lag reconstruction. For this purpose, in contrast to G.718 and G.729.1, some embodiments take information on the reliability of the pitch information into account.

According to conventional technology, the pitch information on which the extrapolation is based comprises the last eight correctly received pitch lags, for which the coding mode was different from UNVOICED. However, in conventional technology, the voicing characteristic might be quite weak, indicated by a low pitch gain (which corresponds to a low prediction gain). In conventional technology, in case the extrapolation is based on pitch lags which have different pitch gains, the extrapolation will not be able to output reasonable results or even fail at all and will fall back to a simple pitch lag repetition approach.

Embodiments are based on the finding that the reason for these shortcomings of conventional technology are that on the encoder side, the pitch lag is chosen with respect to maximize the pitch gain in order to maximize the coding gain of the adaptive codebook, but that, in case the speech characteristic is weak, the pitch lag might not indicate the fundamental frequency precisely, since the noise in the speech signal causes the pitch lag estimation to become imprecise.

Therefore, during concealment, according to embodiments, the application of the pitch lag extrapolation is weighted depending on the reliability of the previously received lags used for this extrapolation.

According to some embodiments, the past adaptive codebook gains (pitch gains) may be employed as a reliability measure.

According to some further embodiments of the present invention, weighting according to how far in the past, the pitch lags were received, is used as a reliability measure. For example, high weights are put to more recent lags and less weights are put to lags being received longer ago.

According to embodiments, weighted pitch prediction concepts are provided. In contrast to conventional technology, the provided pitch prediction of embodiments of the present invention uses a reliability measure for each of the pitch lags it is based on, making the prediction result much more valid and stable. Particularly, the pitch gain can be used as an indicator for the reliability. Alternatively or additionally, according to some embodiments, the time that has been passed after the correct reception of the pitch lag may, for example, be used as an indicator.

Regarding pulse resynchronization, the present invention is based on the finding that one of the shortcomings of conventional technology regarding the glottal pulse resynchronization is, that the pitch extrapolation does not take into account, how many pulses (pitch cycles) should be constructed in the concealed frame.

According to conventional technology, the pitch extrapolation is conducted such that changes in the pitch are only expected at the borders of the subframes.

According to embodiments, when conducting glottal pulse resynchronization, pitch changes which are different from continuous pitch changes can be taken into account.

Embodiments of the present invention are based on the finding that G.718 and G.729.1 have the following drawbacks.

At first, in conventional technology, when calculating d, it is assumed that there is an integer number of pitch cycles within the frame. Since d defines the location of the last pulse in the concealed frame, the position of the last pulse will not be correct, when there is a non-integer number of the pitch cycles within the frame. This is depicted in FIG. 6 and FIG. 7. FIG. 6 illustrates a speech signal before a removal of samples. FIG. 7 illustrates the speech signal after the removal of samples. Furthermore, the algorithm employed by conventional technology for the calculation of d is inefficient.

Moreover, the calculation of conventional technology necessitates the number of pulses N in the constructed periodic part of the excitation. This adds not needed computational complexity.

Furthermore, in conventional technology, the calculation of the number of pulses N in the constructed periodic part of the excitation does not take the location of the first pulse into account.

The signals presented in FIG. 4 and FIG. 5 have the same pitch period of length $T_c$.

FIG. 4 illustrates a speech signal having three pulses within a frame.

In contrast, FIG. 5 illustrates a speech signal which only has two pulses within a frame.

These examples illustrated by FIGS. 4 and 5 show that the number of pulses is dependent on the first pulse position.

Moreover, according to conventional technology, it is checked, if T [N−1], the location of the $N^{th}$ pulse in the constructed periodic part of the excitation is within the frame length, even though N is defined to include the first pulse in the following frame.

Furthermore, according to conventional technology, no samples are added or removed before the first and after the last pulse. Embodiments of the present invention are based on the finding that this leads to the drawback that there could be a sudden change in the length of the first full pitch cycle, and moreover, this furthermore leads to the drawback that the length of the pitch cycle after the last pulse could be greater than the length of the last full pitch cycle before the last pulse, even when the pitch lag is decreasing (see FIGS. 6 and 7).

Embodiments are based on the finding that the pulses T [k]=P−dif f and T [n]=P−d are not equal when:

$$d > \left\lceil \frac{T_c}{2} \right\rceil.$$

- In this case dif $f=T_c-d$ and the number of removed samples will be dif f instead of d.
- T [k] is in the future frame and it is moved to the current frame only after removing d samples.
- T[n] is moved to the future frame after adding −d samples (d<0).

This will lead to wrong position of pulses in the concealed frame.

Moreover, embodiments are based on the finding that in conventional technology, the maximum value of d is limited to the minimum allowed value for the coded pitch lag. This is a constraint that limits the occurrences of other problems, but it also limits the possible change in the pitch and thus limits the pulse resynchronization.

Furthermore, embodiments are based on the finding that in conventional technology, the periodic part is constructed using integer pitch lag, and that this creates a frequency shift of the harmonics and significant degradation in concealment of tonal signals with a constant pitch. This degradation can be seen in FIG. 8, wherein FIG. 8 depicts a time-frequency representation of a speech signal being resynchronized when using a rounded pitch lag.

Embodiments are moreover based on the finding that most of the problems of conventional technology occur in situations as illustrated by the examples depicted in FIGS. 6 and 7, where d samples are removed. Here it is considered that there is no constraint on the maximum value for d, in order to make the problem easily visible. The problem also occurs when there is a limit for d, but is not so obviously visible. Instead of continuously increasing the pitch, one would get a sudden increase followed by a sudden decrease of the pitch. Embodiments are based on the finding that this happens, because no samples are removed before and after the last pulse, indirectly also caused by not taking into account that the pulse T [2] moves within the frame after the removal of d samples. The wrong calculation of N also happens in this example.

According to embodiments, improved pulse resynchronization concepts are provided. Embodiments provide improved concealment of monophonic signals, including speech, which is advantageous compared to the existing techniques described in the standards G.718 (see G.718: Frame error robust narrow-band and wideband embedded variable bit-rate coding of speech and audio from 8-32 kbit/s, Recommendation ITU-T G.718, *Telecommunication Standardization Sector of ITU*, June 2008) and G.729.1 (see G.729.1: G.729-based embedded variable bit-rate coder: An 8-32 kbit/s scalable wideband coder bitstream interoperable with g.729, Recommendation ITU-T G.729.1, *Telecommunication Standardization Sector of ITU*, May 2006). The provided embodiments are suitable for signals with a constant pitch, as well as for signals with a changing pitch.

Inter alia, according to embodiments, three techniques are provided.

According to a first technique provided by an embodiment, a search concept for the pulses is provided that, in contrast to G.718 and G.729.1, takes into account the location of the first pulse in the calculation of the number of pulses in the constructed periodic part, denoted as N.

According to a second technique provided by another embodiment, an algorithm for searching for pulses is provided that, in contrast to G.718 and G.729.1, does not need the number of pulses in the constructed periodic part, denoted as N, that takes the location of the first pulse into account, and that directly calculates the last pulse index in the concealed frame, denoted as k.

According to a third technique provided by a further embodiment, a pulse search is not needed. According to this third technique, a construction of the periodic part is combined with the removal or addition of the samples, thus achieving less complexity than previous techniques.

Additionally or alternatively, some embodiments provide the following changes for the above techniques as well as for the techniques of G.718 and G.729.1:

- The fractional part of the pitch lag may, e.g., be used for constructing the periodic part for signals with a constant pitch.
- The offset to the expected location of the last pulse in the concealed frame may, e.g., be calculated for a non-integer number of pitch cycles within the frame.
- Samples may, e.g., be added or removed also before the first pulse and after the last pulse.
- Samples may, e.g., also be added or removed if there is just one pulse.
- The number of samples to be removed or added may e.g. change linearly, following the predicted linear change in the pitch.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
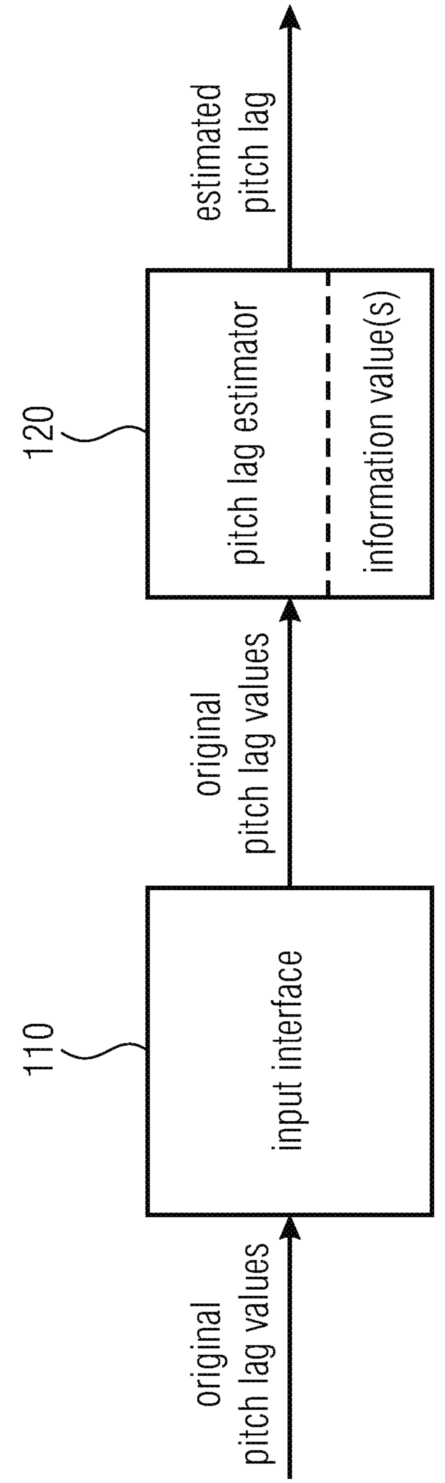
FIG. 1 illustrates an apparatus for determining an estimated pitch lag according to an embodiment.

FIG. 1 illustrates an apparatus for determining an estimated pitch lag according to an embodiment. The apparatus comprises an input interface 110 for receiving a plurality of original pitch lag values, and a pitch lag estimator 120 for estimating the estimated pitch lag. The pitch lag estimator 120 is configured to estimate the estimated pitch lag depending on a plurality of original pitch lag values and depending on a plurality of information values, wherein for each original pitch lag value of the plurality of original pitch lag values, an information value of the plurality of information values is assigned to said original pitch lag value.

According to an embodiment, the pitch lag estimator 120 may, e.g., be configured to estimate the estimated pitch lag depending on the plurality of original pitch lag values and depending on a plurality of pitch gain values as the plurality of information values, wherein for each original pitch lag value of the plurality of original pitch lag values, a pitch gain value of the plurality of pitch gain values is assigned to said original pitch lag value.

In a particular embodiment, each of the plurality of pitch gain values may, e.g., be an adaptive codebook gain.

In an embodiment, the pitch lag estimator 120 may, e.g., be configured to estimate the estimated pitch lag by minimizing an error function.

According to an embodiment, the pitch lag estimator 120 may, e.g., be configured to estimate the estimated pitch lag by determining two parameters a, b, by minimizing the error function $$err = \sum_{i=0}^{k} g_p(i) \cdot ((a + b \cdot i) - P(i))^2,$$

wherein a is a real number, wherein b is a real number, wherein k is an integer with k≥2, and wherein P(i) is the i-th original pitch lag value, wherein $g_p(i)$ is the i-th pitch gain value being assigned to the i-th pitch lag value P(i).

In an embodiment, the pitch lag estimator 120 may, e.g., be configured to estimate the estimated pitch lag by determining two parameters a, b, by minimizing the error function $$err = \sum_{i=0}^{4} g_p(i) \cdot ((a + b \cdot i) - P(i))^2,$$

wherein a is a real number, wherein b is a real number, wherein P(i) is the i-th original pitch lag value, wherein $g_p(i)$ is the i-th pitch gain value being assigned to the i-th pitch lag value P(i).

According to an embodiment, the pitch lag estimator 120 may, e.g., be configured to determine the estimated pitch lag p according to p=a·i+b.

In an embodiment, the pitch lag estimator 120 may, e.g., be configured to estimate the estimated pitch lag depending on the plurality of original pitch lag values and depending on a plurality of time values as the plurality of information values, wherein for each original pitch lag value of the plurality of original pitch lag values, a time value of the plurality of time values is assigned to said original pitch lag value.

According to an embodiment, the pitch lag estimator 120 may, e.g., be configured to estimate the estimated pitch lag by minimizing an error function.

In an embodiment, the pitch lag estimator 120 may, e.g., be configured to estimate the estimated pitch lag by determining two parameters a, b, by minimizing the error function $$err = \sum_{i=0}^{k} \text{time}_{passed}(i) \cdot ((a + b \cdot i) - P(i))^2,$$

wherein a is a real number, wherein b is a real number, wherein k is an integer with k≥2, and wherein P(i) is the i-th original pitch lag value, wherein $\text{time}_{passed}(i)$ is i the i-th time value being assigned to the i-th pitch lag value P(i).

According to an embodiment, the pitch lag estimator 120 may, e.g., be configured to estimate the estimated pitch lag by determining two parameters a, b, by minimizing the error function $$err = \sum_{i=0}^{4} \text{time}_{passed}(i) \cdot ((a + b \cdot i) - P(i))^2,$$

wherein a is a real number, wherein b is a real number, wherein P(i) is the i-th original pitch lag value, wherein $\text{time}_{passed}(i)$ is the i-th time value being assigned to the i-th pitch lag value P(i).

In an embodiment, the pitch lag estimator 120 is configured to determine the estimated pitch lag p according to p=a·i+b.

In the following, embodiments providing weighted pitch prediction are described with respect to formulae (20)-(24b).

At first, weighted pitch prediction embodiments employing weighting according to the pitch gain are described with reference to formulae (20)-(22c). According to some of these embodiments, to overcome the drawback of conventional technology, the pitch lags are weighted with the pitch gain to perform the pitch prediction.

In some embodiments, the pitch gain may be the adaptive-codebook gain $g_p$ as defined in the standard G.729 (see G.729: Coding of speech at 8 kbit/s using conjugate-structure algebraic-code-excited linear prediction (cs-acelp), Recommendation ITU-T G.729*, Telecommunication Standardization Sector of ITU*, June 2012, 4.4, in particular chapter 3.7.3, more particularly formula (43)). In G.729, the adaptive-codebook gain is determined according to:

$$g_p = \frac{\sum_{n=0}^{39} x(n)y(n)}{\sum_{n=0}^{39} y(n)y(n)} \text{ bounded by } 0 \le g_p \le 1.2$$

There, x(n) is the target signal and y(n) is obtained by convolving v(n) with h(n) according to:

$$y(n) = \sum_{i=0}^{n} v(i)h(n-i) \quad n = 0, \ldots, 39$$

wherein v(n) is the adaptive-codebook vector, wherein y(n) the filtered adaptive-codebook vector, and wherein h(n−i) is an impulse response of a weighted synthesis filter, as defined in G.729 (see G.729: Coding of speech at 8 kbit/s using conjugate-structure algebraic-code-excited linear prediction (cs-acelp), Recommendation ITU-T G.729*, Telecommunication Standardization Sector of ITU*, June 2012, 4.4).

Similarly, in some embodiments, the pitch gain may be the adaptive-codebook gain $g_p$ as defined in the standard G.718 (see G.718: Frame error robust narrow-band and wideband embedded variable bit-rate coding of speech and audio from 8-32 kbit/s, Recommendation ITU-T G.718*, Telecommunication Standardization Sector of ITU*, June 2008, in particular chapter 6.8.4.1.4.1, more particularly formula (170)). In G.718, the adaptive-codebook gain is determined according to:

$$C_{CL} = \frac{\sum_{n=0}^{63} x(n)y_k(n)}{\sum_{n=0}^{63} y_k(n)y_k(n)}$$

wherein x(n) is the target signal and $y_k(n)$ is the past filtered excitation at delay k.

For example, see G.718: Frame error robust narrow-band and wideband embedded variable bit-rate coding of speech and audio from 8-32 kbit/s, Recommendation ITU-T G.718, *Telecommunication Standardization Sector of ITU*, June 2008, chapter 6.8.4.1.4.1, formula (171), for a definition, how $y_k(n)$ could be defined.

Similarly, in some embodiments, the pitch gain may be the adaptive-codebook gain $g_p$ as defined in the AMR standard (see Speech codec speech processing functions; adaptive multi-rate-wideband (AMRWB) speech codec; error concealment of erroneous or lost frames, 3GPP TS 26.191, 3*rd Generation Partnership Project*, September 2012), wherein the adaptive-codebook gain $g_p$ as the pitch gain is defined according to:

$$g_p = \frac{\sum_{n=0}^{63} x(n)y(n)}{\sum_{n=0}^{63} y(n)y(n)} \text{ bounded by } 0 \le g_p \le 1.2$$

wherein y(n) is a filtered adaptive codebook vector.

In some particular embodiments, the pitch lags may, e.g., be weighted with the pitch gain, for example, prior to performing the pitch prediction.

For this purpose, according to an embodiment, a second buffer of length 8 may, for example, be introduced holding the pitch gains, which are taken at the same subframes as the pitch lags. In an embodiment, the buffer may, e.g., be updated using the exact same rules as the update of the pitch lags. One possible realization is to update both buffers (holding pitch lags and pitch gains of the last eight subframes) at the end of each frame, regardless whether this frame was error free or error prone.

There are two different prediction strategies known from conventional technology, which can be enhanced to use weighted pitch prediction.

Some embodiments provide significant inventive improvements of the prediction strategy of the G.718 standard. In G.718, in case of a packet loss, the buffers may be multiplied with each other element wise, in order to weight the pitch lag with a high factor if the associated pitch gain is high, and to weight it with a low factor if the associated pitch gain is low. After that, according to G.718, the pitch prediction is performed like usual (see G.718: Frame error robust narrow-band and wideband embedded variable bit-rate coding of speech and audio from 8-32 kbit/s, Recommendation ITU-T G.718, *Telecommunication Standardization Sector of ITU*, June 2008, section 7.11.1.3, for details on G.718).

Some embodiments provide significant inventive improvements of the prediction strategy of the G.729.1 standard. The algorithm used in G.729.1 to predict the pitch (see G.729.1: G.729-based embedded variable bit-rate coder: An 8-32 kbit/s scalable wideband coder bitstream interoperable with g.729, Recommendation ITU-T G.729.1, *Telecommunication Standardization Sector of ITU*, May 2006, for details on G.729.1) is modified according to embodiments in order to use weighted prediction.

According to some embodiments, the goal is to minimize the error function:

$$err = \sum_{i=0}^{4} g_p(i) \cdot ((a + b \cdot i) - P(i))^2 \tag{20}$$

wherein $g_p(i)$ is holding the pitch gains from the past subframes and P(i) is holding the corresponding pitch lags.

In the inventive formula (20), $g_p(i)$ is representing the weighting factor. In the above example, each $g_p(i)$ is representing a pitch gain from one of the past subframes.

Below, equations according to embodiments are provided, which describe how to derive the factors a and b, which could be used to predict the pitch lag according to: a+i·b, where i is the subframe number of the subframe to be predicted.

For example, to obtain the first predicted subframe based the prediction on the last five subframes P(0), . . . , P(4), the predicted pitch value P(5) would be:

$$P(5)=a+5\cdot b.$$

In order to derive the coefficients a and b, the error function may, for example, be derived (derivated) and may be set to zero:

$$\frac{\delta\ err}{\delta\ a} = 0 \text{ and } \frac{\delta\ err}{\delta\ b} = 0 \tag{21a}$$

Conventional technology that does not disclose to employ the inventive weighting provided by embodiments. In particular, conventional technology does not employ the weighting factor $g_p(i)$.

Thus, in conventional technology, which does not employ a weighting factor $g_p(i)$, deriving the error function and setting the derivative of the error function to 0 would result to:

$$a = \frac{3\sum_{i=0}^{4} P(i) - \sum_{i=0}^{4} i \cdot P(i)}{5} \text{ and } b = \frac{\sum_{i=0}^{4} i \cdot P(i) - 2\sum_{i=0}^{4} P(i)}{10} \tag{21b}$$

(see G.729.1: G.729-based embedded variable bit-rate coder: An 8-32 kbit/s scalable wideband coder bitstream interoperable with g.729, Recommendation ITU-T G.729.1, *Telecommunication Standardization Sector of ITU*, May 2006, 7.6.5).

In contrast, when using the weighted prediction approach of the provided embodiments, e.g., the weighted prediction approach of formula (20) with weighting factor gp(i), a and b result to:

$$a = -\frac{A + B + C + D + E}{K} \tag{22a}$$

$$b = +\frac{F + G + H + I + J}{K} \tag{22b}$$

According to a particular embodiment, A, B, C, D; E, F, G, H, i, J and K may, e.g., have the following values:

$$A=(3g_{p3}+4g_{p2}+3g_{p1})g_{p4}\cdot P(4)$$

$$B=((2g_{p2}+2g_{p1})g_{p3}-4g_{p3}g_{p4})\cdot c\ P(3)$$

$$C=(-8g_{p2}g_{p4}-3g_{p2}g_{p3}+g_{p1}g_{p2})\cdot P(3)$$

$D=(-12g_{p1}g_{p4}-6g_{p1}g_{p3}-2g_{p1}g_{p2})\cdot P(1)$ $E=(-12g_{p0}g_{p4}-9g_{p0}g_{p3}-4g_{p0}g_{p2}-g_{p0}g_{p1})\cdot P(0)$ $F=(g_{p3}+2g_{p2}+3g_{p1}+4g_{p0})g_{p4}\cdot P(4)$ $G=((g_{p2}+2g_{p1}+3g_{p0})g_{p3}-g_{p3}g_{p4})\cdot P(3)$ $H=(-2g_{p2}g_{p4}-g_{p2}g_{p3}+(g_{p1}+2g_{p0})g_{p2})\cdot P(2)$ $I=(-3g_{p1}g_{p4}-2g_{p1}g_{p3}-g_{p1}g_{p2}+g_{p0}g_{p1})\cdot P(1)$ $J=(-4g_{p0}g_{p4}-3g_{p0}g_{p3}-2g_{p0}g_{p2}-g_{p0}g_{p1})\cdot P(0)$ $$K=(g_{p2}+4g_{p2}+9g_{p1}+16g_{p0})g_{p4}+(g_{p2}+4g_{p1}+9g_{p0})g_{p3}+(g_{p1}+4g_{p0})g_{p2}+g_{p0}g_{p1} \quad (22c)$$

Figure 10:
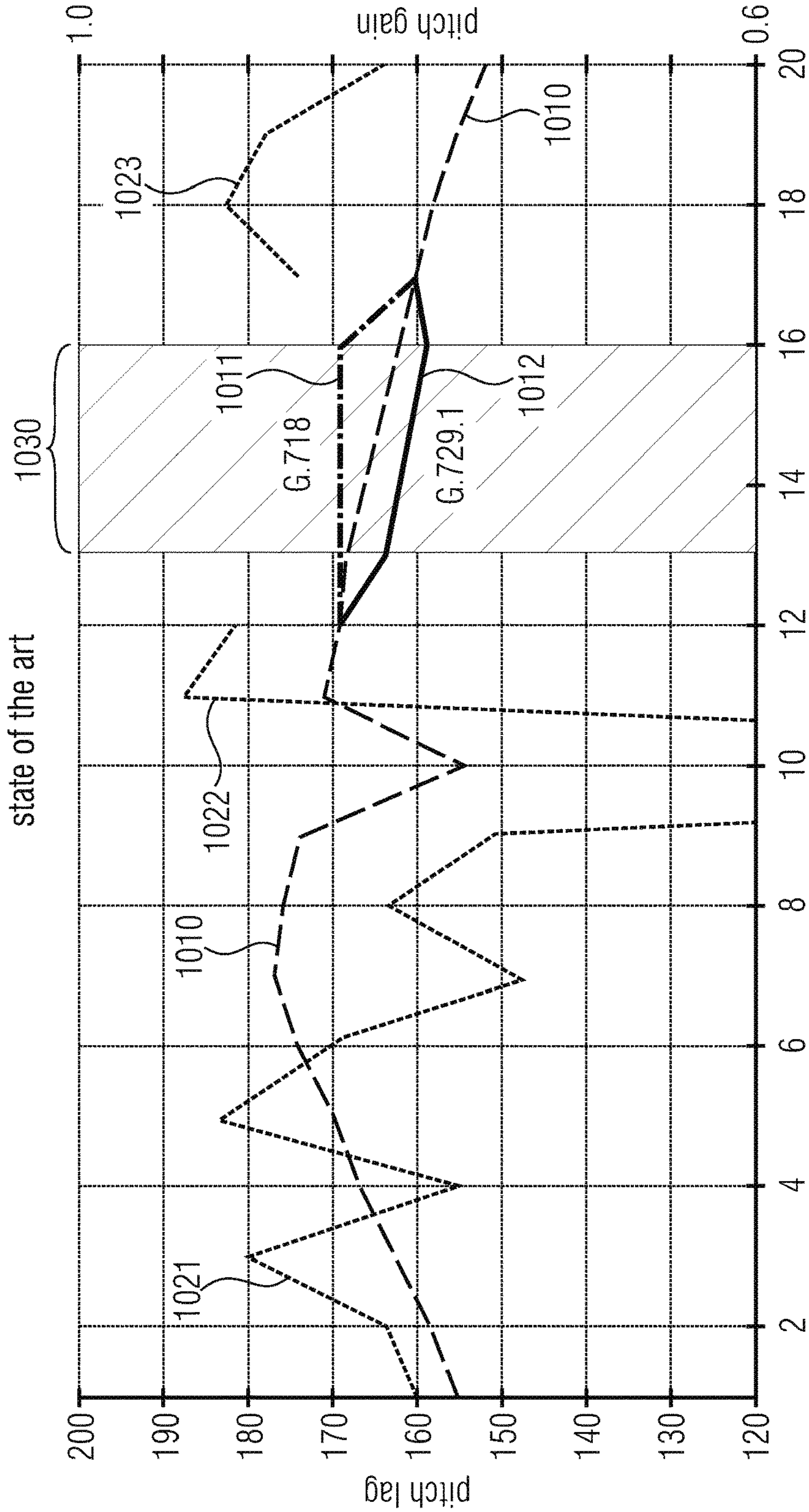
FIG. 10 illustrates a pitch lag diagram, wherein the pitch lag is reconstructed employing state of the art concepts.
Figure 11:
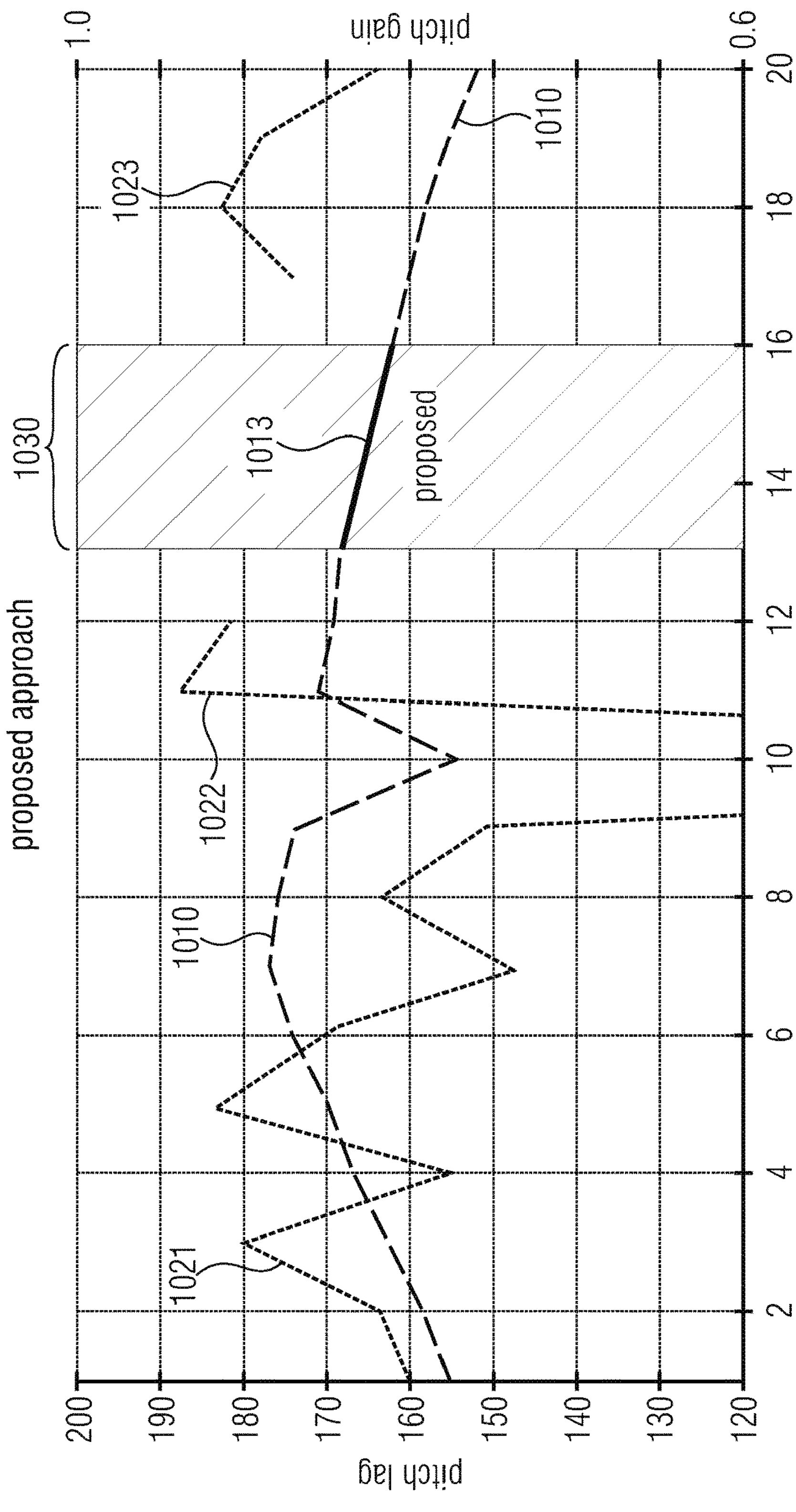
FIG. 11 illustrates a pitch lag diagram, wherein the pitch lag is reconstructed according to embodiments.

FIG. 10 and FIG. 11 show the superior performance of the proposed pitch extrapolation.

There, FIG. 10 illustrates a pitch lag diagram, wherein the pitch lag is reconstructed employing state of the art concepts. In contrast, FIG. 11 illustrates a pitch lag diagram, wherein the pitch lag is reconstructed according to embodiments.

In particular, FIG. 10 illustrates the performance of conventional technology standards G.718 and G.729.1, while FIG. 11 illustrates the performance of a provided concept provided by an embodiment.

The abscissa axis denotes the subframe number. The continuous line 1010 shows the encoder pitch lag which is embedded in the bitstream, and which is lost in the area of the grey segment 1030. The left ordinate axis represents a pitch lag axis. The right ordinate axis represents a pitch gain axis. The continuous line 1010 illustrates the pitch lag, while the dashed lines 1021, 1022, 1023 illustrate the pitch gain.

The grey rectangle 1030 denotes the frame loss. Because of the frame loss that occurred in the area of the grey segment 1030, information on the pitch lag and pitch gain in this area is not available at the decoder side and has to be reconstructed.

In FIG. 10, the pitch lag being concealed using the G.718 standard is illustrated by the dashed-dotted line portion 1011. The pitch lag being concealed using the G.729.1 standard is illustrated by the continuous line portion 1012. It can be clearly seen, that using the provided pitch prediction (FIG. 11, continuous line portion 1013) corresponds essentially to the lost encoder pitch lag and is thus advantageous over the G.718 and G.729.1 techniques.

In the following, embodiments employing weighting depending on passed time are described with reference to formulae (23a)-(24b).

To overcome the drawbacks of conventional technology, some embodiments apply a time weighting on the pitch lags, prior to performing the pitch prediction. Applying a time weighting can be achieved by minimizing this error function:

$$err=\sum_{i=0}^{4}\text{time}_{passed}(i)\cdot((a+b\cdot i)-P(i))^2 \quad (23a)$$

where $\text{time}_{passed}(i)$ is representing the inverse of the amount of time that has passed after correctly receiving the pitch lag and P(i) is holding the corresponding pitch lags.

Some embodiments may, e.g., put high weights to more recent lags and less weight to lags being received longer ago.

According to some embodiments, formula (21a) may then be employed to derive a and b.

To obtain the first predicted subframe, some embodiments may, e.g., conduct the prediction based on the last five subframes, P(0) . . . P(4). For example, the predicted pitch value P(5) may then be obtained according to:

$$P(5)=a+5\cdot b \quad (23b)$$

For example, if $$\text{time}_{passed}[\tfrac{1}{5}\ \tfrac{1}{4}\ \tfrac{1}{3}\ \tfrac{1}{2}\ 1]$$

(time weighting according to subframe delay), this would result to:

$$a=\frac{-3.5833\cdot P(4)+1.4167\cdot P(3)+3.0833\cdot P(2)+3.9167\cdot P(1)+4.4167\cdot P(0)}{9.2500} \quad (24a)$$

$$b=\frac{+2.7167\cdot P(4)+0.2167\cdot P(3)-0.6167\cdot P(2)-1.0333\cdot P(1)-1.2833\cdot P(0)}{9.2500} \quad (24b)$$

In the following, embodiments providing pulse resynchronization are described.

Figure 2A:
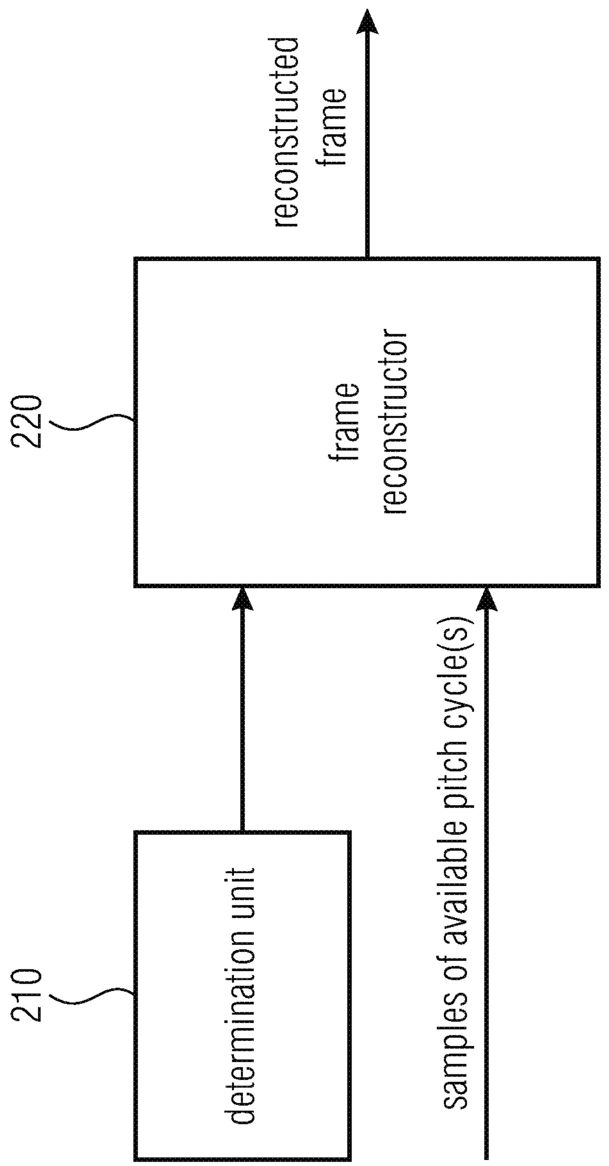
FIG. 2*a* illustrates an apparatus for reconstructing a frame comprising a speech signal as a reconstructed frame according to an embodiment.

FIG. 2*a* illustrates an apparatus for reconstructing a frame comprising a speech signal as a reconstructed frame according to an embodiment. Said reconstructed frame is associated with one or more available frames, said one or more available frames being at least one of one or more preceding frames of the reconstructed frame and one or more succeeding frames of the reconstructed frame, wherein the one or more available frames comprise one or more pitch cycles as one or more available pitch cycles.

The apparatus comprises a determination unit 210 for determining a sample number difference ($\Delta_0^P;\Delta_i;\Delta_{k+1}^P$) indicating a difference between a number of samples of one of the one or more available pitch cycles and a number of samples of a first pitch cycle to be reconstructed.

Moreover, the apparatus comprises a frame reconstructor for reconstructing the reconstructed frame by reconstructing, depending on the sample number difference ($\Delta_0^P;\Delta_i;\Delta_{k+1}^P$) and depending on the samples of said one of the one or more available pitch cycles, the first pitch cycle to be reconstructed as a first reconstructed pitch cycle.

The frame reconstructor 220 is configured to reconstruct the reconstructed frame, such that the reconstructed frame completely or partially comprises the first reconstructed pitch cycle, such that the reconstructed frame completely or partially comprises a second reconstructed pitch cycle, and such that the number of samples of the first reconstructed pitch cycle differs from a number of samples of the second reconstructed pitch cycle.

Reconstructing a pitch cycle is conducted by reconstructing some or all of the samples of the pitch cycle that shall be reconstructed. If the pitch cycle to be reconstructed is completely comprised by a frame that is lost, then all of the samples of the pitch cycle may, e.g., have to be reconstructed. If the pitch cycle to be reconstructed is only partially comprised by the frame that is lost, and if some the samples of the pitch cycle are available, e.g., as they are comprised another frame, than it may, e.g., be sufficient to only reconstruct the samples of the pitch cycle that are comprised by the frame that is lost to reconstruct the pitch cycle.

Figure 2B:
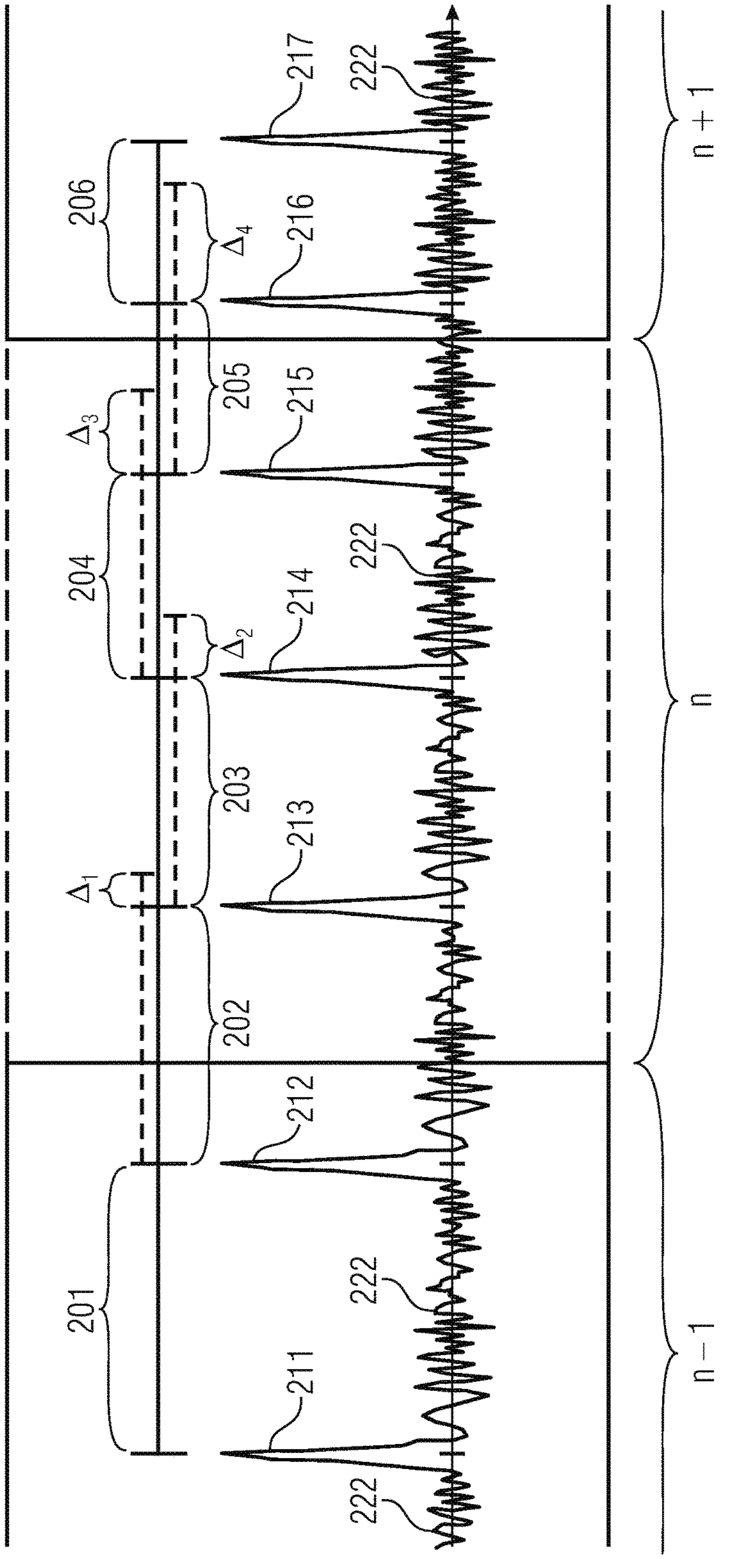
FIG. 2*b* illustrates a speech signal comprising a plurality of pulses.

FIG. 2*b* illustrates the functionality of the apparatus of FIG. 2*a*. In particular, FIG. 2*b* illustrates a speech signal 222 comprising the pulses 211, 212, 213, 214, 215, 216, 217.

A first portion of the speech signal 222 is comprised by a frame n−1. A second portion of the speech signal 222 is comprised by a frame n. A third portion of the speech signal 222 is comprised by a frame n+1.

In FIG. 2*b*, frame n−1 is preceding frame n and frame n+1 is succeeding frame n. This means, frame n−1 comprises a portion of the speech signal that occurred earlier in time compared to the portion of the speech signal of frame n; and frame n+1 comprises a portion of the speech signal that occurred later in time compared to the portion of the speech signal of frame n.

In the example of FIG. 2*b* it is assumed that frame n got lost or is corrupted and thus, only the frames preceding frame n ("preceding frames") and the frames succeeding frame n ("succeeding frames") are available ("available frames").

A pitch cycle, may, for example, be defined as follows: A pitch cycle starts with one of the pulses 211, 212, 213, etc. and ends with the immediately succeeding pulse in the speech signal. For example, pulse 211 and 212 define the pitch cycle 201. Pulse 212 and 213 define the pitch cycle 202. Pulses 213 and 214 define the pitch cycle 203, etc.

Other definitions of the pitch cycle, well known to a person skilled in the art, which employ, for example, other start and end points of the pitch cycle, may alternatively be considered.

In the example of FIG. 2*b*, frame n is not available at a receiver or is corrupted. Thus, the receiver is aware of the pulses 211 and 212 and of the pitch cycle 201 of frame n−1. Moreover, the receiver is aware of the pulses 216 and 217 and of the pitch cycle 206 of frame n+1. However, frame n which comprises the pulses 213, 214 and 215, which completely comprises the pitch cycles 203 and 204 and which partially comprises the pitch cycles 202 and 205, has to be reconstructed.

According to some embodiments, frame n may be reconstructed depending on the samples of at least one pitch cycle ("available pitch cycles") of the available frames (e.g., preceding frame n−1 or succeeding frame n+1). For example, the samples of the pitch cycle 201 of frame n−1 may, e.g., cyclically repeatedly copied to reconstruct the samples of the lost or corrupted frame. By cyclically repeatedly copying the samples of the pitch cycle, the pitch cycle itself is copied, e.g., if the pitch cycle is c, then $$\text{sample}(x+i\cdot c)=\text{sample}(x);\ \text{with } i \text{ being an integer.}$$

In embodiments, samples from the end of the frame n−1 are copied. The length of the portion of the n−1st frame that is copied is equal to the length of the pitch cycle 201 (or almost equal). But the samples from both 201 and 202 are used for copying. This may be especially carefully considered when there is just one pulse in the n−$1^{st}$ frame.

In some embodiments, the copied samples are modified.

The present invention is moreover based on the finding that by cyclically repeatedly copying the samples of a pitch cycle, the pulses 213, 214, 215 of the lost frame n move to wrong positions, when the size of the pitch cycles that are (completely or partially) comprised by the lost frame (n) (pitch cycles 202, 203, 204 and 205) differs from the size of the copied available pitch cycle (here: pitch cycle 201).

E.g., in FIG. 2*b*, the difference between pitch cycle 201 and pitch cycle 202 is indicated by $\Delta_1$, the difference between pitch cycle 201 and pitch cycle 203 is indicated by $\Delta_2$, the difference between pitch cycle 201 and pitch cycle 204 is indicated by $\Delta_3$, and the difference between pitch cycle 201 and pitch cycle 205 is indicated by $\Delta_4$.

In FIG. 2*b*, it can be seen that pitch cycle 201 of frame n−1 is significantly greater than pitch cycle 206. Moreover, the pitch cycles 202, 203, 204 and 205, being (partially or completely) comprised by frame n, are each smaller than pitch cycle 201 and greater than pitch cycle 206. Furthermore, the pitch cycles being closer to the large pitch cycle 201 (e.g., pitch cycle 202) are larger than the pitch cycles (e.g., pitch cycle 205) being closer to the small pitch cycle 206.

Based on these findings of the present invention, according to embodiments, the frame reconstructor 220 is configured to reconstruct the reconstructed frame such that the number of samples of the first reconstructed pitch cycle differs from a number of samples of a second reconstructed pitch cycle being partially or completely comprised by the reconstructed frame.

E.g., according to some embodiments, the reconstruction of the frame depends on a sample number difference indicating a difference between a number of samples of one of the one or more available pitch cycles (e.g., pitch cycle 201) and a number of samples of a first pitch cycle (e.g., pitch cycle 202, 203, 204, 205) that shall be reconstructed.

For example, according to an embodiment, the samples of pitch cycle 201 may, e.g., be cyclically repeatedly copied.

Then, the sample number difference indicates how many samples shall be deleted from the cyclically repeated copy corresponding to the first pitch cycle to be reconstructed, or how many samples shall be added to the cyclically repeated copy corresponding to the first pitch cycle to be reconstructed.

In FIG. 2*b*, each sample number indicates how many samples shall be deleted from the cyclically repeated copy. However, in other examples, the sample number may indicate how many samples shall be added to the cyclically repeated copy. For example, in some embodiments, samples may be added by adding samples with amplitude zero to the corresponding pitch cycle. In other embodiments, samples may be added to the pitch cycle by coping other samples of the pitch cycle, e.g., by copying samples being neighboured to the positions of the samples to be added.

While above, embodiments have been described where samples of a pitch cycle of a frame preceding the lost or corrupted frame have been cyclically repeatedly copied, in other embodiments, samples of a pitch cycle of a frame succeeding the lost or corrupted frame are cyclically repeatedly copied to reconstruct the lost frame. The same principles described above and below apply analogously.

Such a sample number difference may be determined for each pitch cycle to be reconstructed. Then, the sample number difference of each pitch cycle indicates how many samples shall be deleted from the cyclically repeated copy corresponding to the corresponding pitch cycle to be reconstructed, or how many samples shall be added to the cyclically repeated copy corresponding to the corresponding pitch cycle to be reconstructed.

According to an embodiment, the determination unit 210 may, e.g., be configured to determine a sample number difference for each of a plurality of pitch cycles to be reconstructed, such that the sample number difference of each of the pitch cycles indicates a difference between the number of samples of said one of the one or more available pitch cycles and a number of samples of said pitch cycle to be reconstructed. The frame reconstructor 220 may, e.g., be configured to reconstruct each pitch cycle of the plurality of pitch cycles to be reconstructed depending on the sample number difference of said pitch cycle to be reconstructed and depending on the samples of said one of the one or more available pitch cycles, to reconstruct the reconstructed frame.

In an embodiment, the frame reconstructor 220 may, e.g., be configured to generate an intermediate frame depending on said one of the of the one or more available pitch cycles. The frame reconstructor 220 may, e.g., be configured to modify the intermediate frame to obtain the reconstructed frame.

According to an embodiment, the determination unit 210 may, e.g., be configured to determine a frame difference value (d; s) indicating how many samples are to be removed from the intermediate frame or how many samples are to be added to the intermediate frame. Moreover, the frame reconstructor 220 may, e.g., be configured to remove first samples from the intermediate frame to obtain the reconstructed frame, when the frame difference value indicates that the first samples shall be removed from the frame. Furthermore, the frame reconstructor 220 may, e.g., be configured to add second samples to the intermediate frame to obtain the reconstructed frame, when the frame difference value (d; s) indicates that the second samples shall be added to the frame.

In an embodiment, the frame reconstructor 220 may, e.g., be configured to remove the first samples from the intermediate frame when the frame difference value indicates that the first samples shall be removed from the frame, so that the number of first samples that are removed from the intermediate frame is indicated by the frame difference value. Moreover, the frame reconstructor 220 may, e.g., be configured to add the second samples to the intermediate frame when the frame difference value indicates that the second samples shall be added to the frame, so that the number of second samples that are added to the intermediate frame is indicated by the frame difference value.

According to an embodiment, the determination unit 210 may, e.g., be configured to determine the frame difference number s so that the formula:

$$s = \sum_{i=0}^{M-1} (p[i] - T_r)\frac{L}{MT_r}$$

holds true, wherein L indicates a number of samples of the reconstructed frame, wherein M indicates a number of subframes of the reconstructed frame, wherein $T_r$ indicates a rounded pitch period length of said one of the one or more available pitch cycles, and wherein p[i] indicates a pitch period length of a reconstructed pitch cycle of the i-th subframe of the reconstructed frame.

In an embodiment, the frame reconstructor 220 may, e.g., be adapted to generate an intermediate frame depending on said one of the one or more available pitch cycles. Moreover, the frame reconstructor 220 may, e.g., be adapted to generate the intermediate frame so that the intermediate frame comprises a first partial intermediate pitch cycle, one or more further intermediate pitch cycles, and a second partial intermediate pitch cycle. Furthermore, the first partial intermediate pitch cycle may, e.g., depend on one or more of the samples of said one of the one or more available pitch cycles, wherein each of the one or more further intermediate pitch cycles depends on all of the samples of said one of the one or more available pitch cycles, and wherein the second partial intermediate pitch cycle depends on one or more of the samples of said one of the one or more available pitch cycles. Moreover, the determination unit 210 may, e.g., be configured to determine a start portion difference number indicating how many samples are to be removed or added from the first partial intermediate pitch cycle, and wherein the frame reconstructor 220 is configured to remove one or more first samples from the first partial intermediate pitch cycle, or is configured to add one or more first samples to the first partial intermediate pitch cycle depending on the start portion difference number. Furthermore, the determination unit 210 may, e.g., be configured to determine for each of the further intermediate pitch cycles a pitch cycle difference number indicating how many samples are to be removed or added from said one of the further intermediate pitch cycles. Moreover, the frame reconstructor 220 may, e.g., be configured to remove one or more second samples from said one of the further intermediate pitch cycles, or is configured to add one or more second samples to said one of the further intermediate pitch cycles depending on said pitch cycle difference number. Furthermore, the determination unit 210 may, e.g., be configured to determine an end portion difference number indicating how many samples are to be removed or added from the second partial intermediate pitch cycle, and wherein the frame reconstructor 220 is configured to remove one or more third samples from the second partial intermediate pitch cycle, or is configured to add one or more third samples to the second partial intermediate pitch cycle depending on the end portion difference number.

According to an embodiment, the frame reconstructor 220 may, e.g., be configured to generate an intermediate frame depending on said one of the of the one or more available pitch cycles. Moreover, the determination unit 210 may, e.g., be adapted to determine one or more low energy signal portions of the speech signal comprised by the intermediate frame, wherein each of the one or more low energy signal portions is a first signal portion of the speech signal within the intermediate frame, where the energy of the speech signal is lower than in a second signal portion of the speech signal comprised by the intermediate frame. Furthermore, the frame reconstructor 220 may, e.g., be configured to remove one or more samples from at least one of the one or more low energy signal portions of the speech signal, or to add one or more samples to at least one of the one or more low energy signal portions of the speech signal, to obtain the reconstructed frame.

In a particular embodiment, the frame reconstructor 220 may, e.g., be configured to generate the intermediate frame, such that the intermediate frame comprises one or more reconstructed pitch cycles, such that each of the one or more reconstructed pitch cycles depends on said one of the of the one or more available pitch cycles. Moreover, the determination unit 210 may, e.g., be configured to determine a number of samples that shall be removed from each of the one or more reconstructed pitch cycles. Furthermore, the determination unit 210 may, e.g., be configured to determine each of the one or more low energy signal portions such that for each of the one or more low energy signal portions a number of samples of said low energy signal portion depends on the number of samples that shall be removed from one of the one or more reconstructed pitch cycles, wherein said low energy signal portion is located within said one of the one or more reconstructed pitch cycles.

In an embodiment, the determination unit 210 may, e.g., be configured to determine a position of one or more pulses of the speech signal of the frame to be reconstructed as reconstructed frame. Moreover, the frame reconstructor 220 may, e.g., be configured to reconstruct the reconstructed frame depending on the position of the one or more pulses of the speech signal.

According to an embodiment, the determination unit 210 may, e.g., be configured to determine a position of two or more pulses of the speech signal of the frame to be reconstructed as reconstructed frame, wherein T [0] is the position of one of the two or more pulses of the speech signal of the frame to be reconstructed as reconstructed frame, and wherein the determination unit 210 is configured to determine the position (T [i]) of further pulses of the two or more pulses of the speech signal according to the formula:

$$T[i]=T[0]+i\ T_r$$

wherein $T_r$ indicates a rounded length of said one of the one or more available pitch cycles, and wherein i is an integer.

According to an embodiment, the determination unit 210 may, e.g., be configured to determine an index k of the last pulse of the speech signal of the frame to be reconstructed as the reconstructed frame such that $$k=\left\lceil \frac{L-s-T[0]}{T_r}-1\right\rceil,$$

wherein L indicates a number of samples of the reconstructed frame, wherein s indicates the frame difference value, wherein T [0] indicates a position of a pulse of the speech signal of the frame to be reconstructed as the reconstructed frame, being different from the last pulse of the speech signal, and wherein $T_r$ indicates a rounded length of said one of the one or more available pitch cycles.

In an embodiment, the determination unit 210 may, e.g., be configured to reconstruct the frame to be reconstructed as the reconstructed frame by determining a parameter δ, wherein δ is defined according to the formula:

$$\delta=\frac{T_{ext}-T_p}{M}$$

wherein the frame to be reconstructed as the reconstructed frame comprises M subframes, wherein $T_p$ indicates the length of said one of the one or more available pitch cycles, and wherein $T_{ext}$ $T_{ext}$ indicates a length of one of the pitch cycles to be reconstructed of the frame to be reconstructed as the reconstructed frame.

According to an embodiment, the determination unit 210 may, e.g., be configured to reconstruct the reconstructed frame by determining a rounded length $T_r$ of said one of the one or more available pitch cycles based on formula:

$$T_r=\lfloor T_p+0.5\rfloor$$

wherein $T_p$ indicates the length of said one of the one or more available pitch cycles.

In an embodiment, the determination unit 210 may, e.g., be configured to reconstruct the reconstructed frame by applying the formula:

$$s=\delta\frac{L}{T_r}\frac{M+1}{2}-L\left(1-\frac{T_p}{T_r}\right)$$

wherein $T_p$ indicates the length of said one of the one or more available pitch cycles, wherein $T_r$ indicates a rounded length of said one of the one or more available pitch cycles, wherein the frame to be reconstructed as the reconstructed frame comprises M subframes, wherein the frame to be reconstructed as the reconstructed frame comprises L samples, and wherein δ is a real number indicating a difference between a number of samples of said one of the one or more available pitch cycles and a number of samples of one of one or more pitch cycles to be reconstructed.

Now, embodiments are described in more detail.

In the following, a first group of pulse resynchronization embodiments is described with reference to formulae (25)-(63).

In such embodiments, if there is no pitch change, the last pitch lag is used without rounding, preserving the fractional part. The periodic part is constructed using the non-integer pitch and interpolation as for example in J. S. Marques, I. Trancoso, J. M. Tribolet, and L. B. Almeida, Improved pitch prediction with fractional delays in celp coding, 1990 *International Conference on Acoustics, Speech, and Signal Processing,* 1990. ICASSP-90, 1990, pp. 665-668 vol. 2. This will reduce the frequency shift of the harmonics, compared to using the rounded pitch lag and thus significantly improve concealment of tonal or voiced signals with constant pitch.

Figure 8:
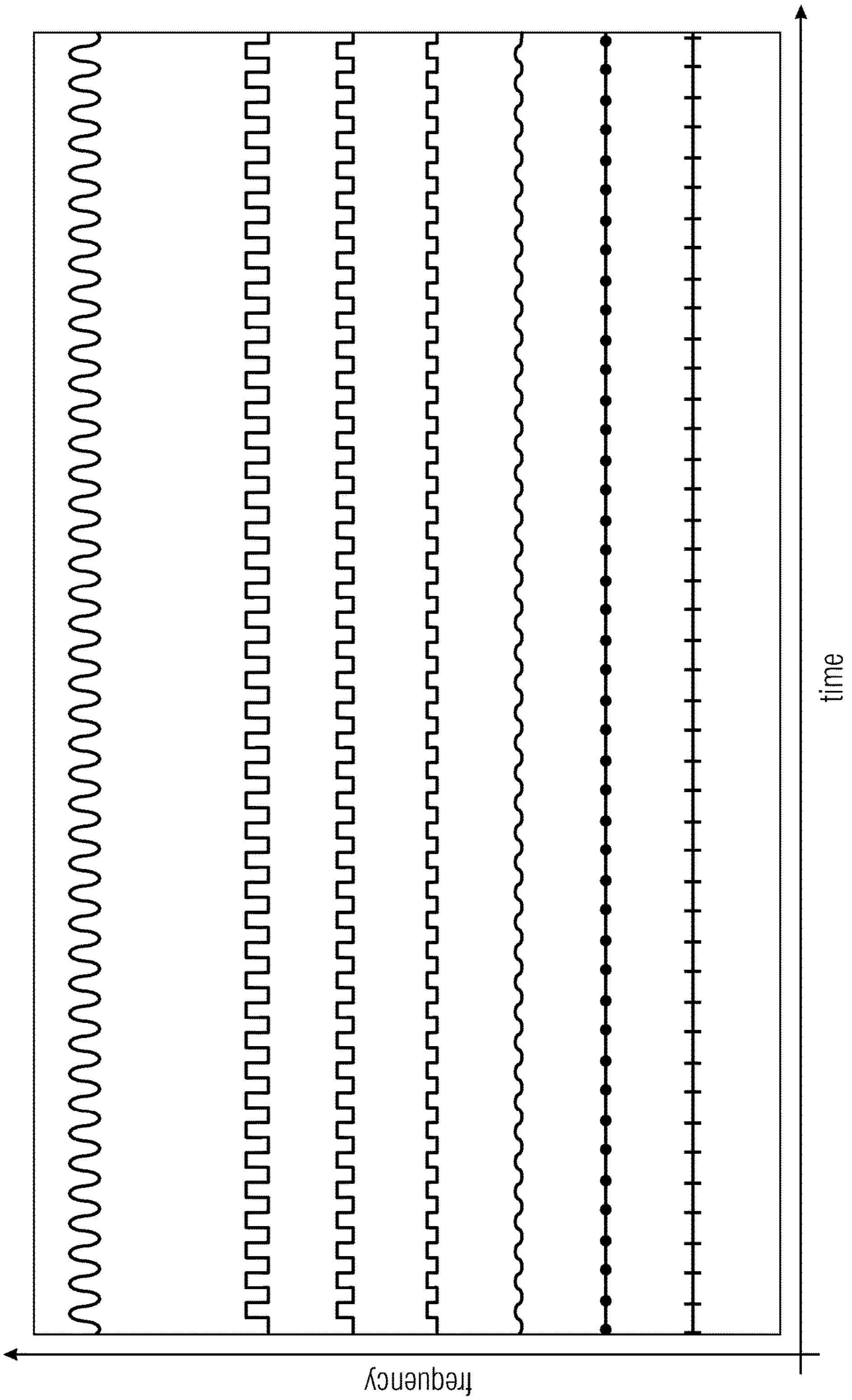
FIG 8 Prior Art
FIG. 8 illustrates a time-frequency representation of a speech signal being resynchronized using a rounded pitch lag.
Figure 9:
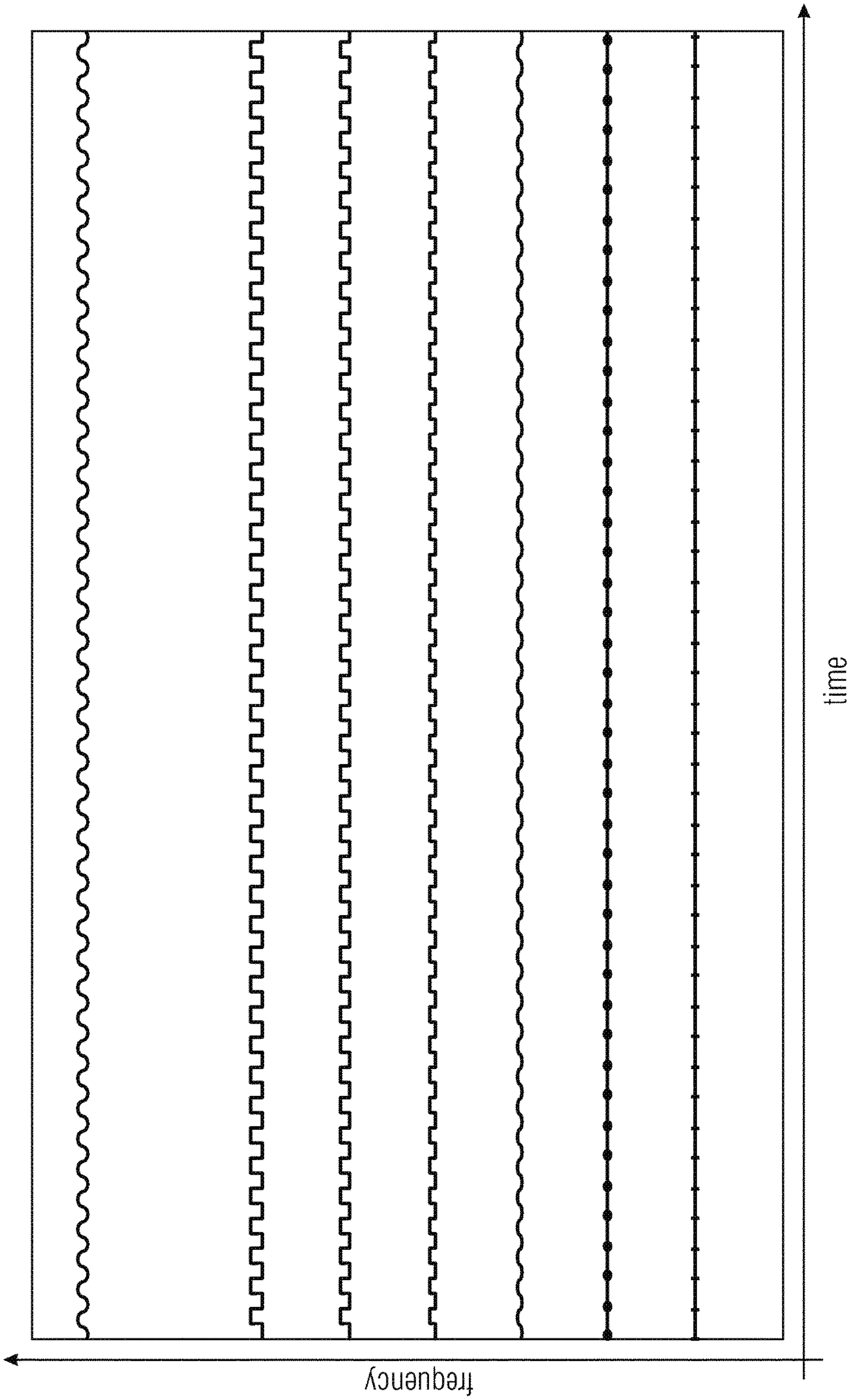
FIG. 9 illustrates a time-frequency representation of a speech signal being resynchronized using a non-rounded pitch lag with the fractional part.

The advantage is illustrated by FIG. 8 and FIG. 9, where the signal representing pitch pipe with frame losses is concealed using respectively rounded and non-rounded fractional pitch lag. There, FIG. 8 illustrates a time-frequency representation of a speech signal being resynchronized using a rounded pitch lag. In contrast, FIG. 9 illustrates a time-frequency representation of a speech signal being resynchronized using a non-rounded pitch lag with the fractional part.

There will be an increased computational complexity when using the fractional part of the pitch. This should not influence the worst case complexity as there is no need for the glottal pulse resynchronization.

If there is no predicted pitch change then there is no need for the processing explained below.

If a pitch change is predicted, the embodiments described with reference to formulae (25)-(63) provide concepts for determining d, being the difference, between the sum of the total number of samples within pitch cycles with the constant pitch ($T_c$) and the sum of the total number of samples within pitch cycles with the evolving pitch p[i].

In the following, $T_c$ is defined as in formula (15a): $T_c$=round (last_pitch).

According to embodiments, the difference, d may be determined using a faster and more precise algorithm (fast algorithm for determining d approach) as described in the following.

Such an algorithm may, e.g., be based on the following principles:

In each subframe i: $T_c-p[i]$ samples for each pitch cycle (of length $T_c$) should be removed (or $p[i]-T_c$ added if $T_c-p[i]<0$).

There are $$\frac{\text{L\_subfr}}{T_c}$$

pitch cycles in each subframe.

Thus, for each subframe $$(T_c-p[i])\frac{\text{L\_subfr}}{T_c}$$

samples should be removed.

According to some embodiments, no rounding is conducted and a fractional pitch is used. Then:

$$p[i]=T_c+(i+1)\delta.$$

Thus, for each subframe i, $$-(i+1)\delta\frac{\text{L\_subfr}}{T_c}$$

samples should be removed if δ<0 (or added if δ>0). Thus, $$d=-\delta\frac{\text{L\_subfr}}{T_c}\Sigma_{i=1}^{M} i$$

(where M is the number of subframes in a frame).

According to some other embodiments, rounding is conducted. For the integer pitch (M is the number of subframes in a frame), d is defined as follows:

$$d=\text{round}\left(\left(MT_c-\sum_{i=0}^{M-1}p[i]\right)\frac{\text{L\_subfr}}{T_c}\right) \quad (25)$$

According to an embodiment, an algorithm is provided for calculating d accordingly:

```
ftmp = 0;
for (i=0;i <M;i++) {
    ftmp += p[i];
}
d = (short)floor((M*T_c - ftmp)*(float)L_subfr/ T_c +0.5);
```

In another embodiment, the last line of the algorithm is replaced by:

$d$=(short)floor($L$_frame−$ftmp$*(float)$L$_subfr/$T$_$c$+0.5);

According to embodiments the last pulse T[n] is found according to:

$$n=i\,|\,T[0]+iT_c<L\_\text{frame} \wedge T[0]+(i+1)T_c\geq L\_\text{frame} \quad (26)$$

According to an embodiment, a formula to calculate N is employed. This formula is obtained from formula (26) according to:

$$N=1+\left\lceil\frac{\text{L\_frame}-T[0]}{T_c}\right\rceil \quad (27)$$

and the last pulse has then the index N−1.

Figure 4:
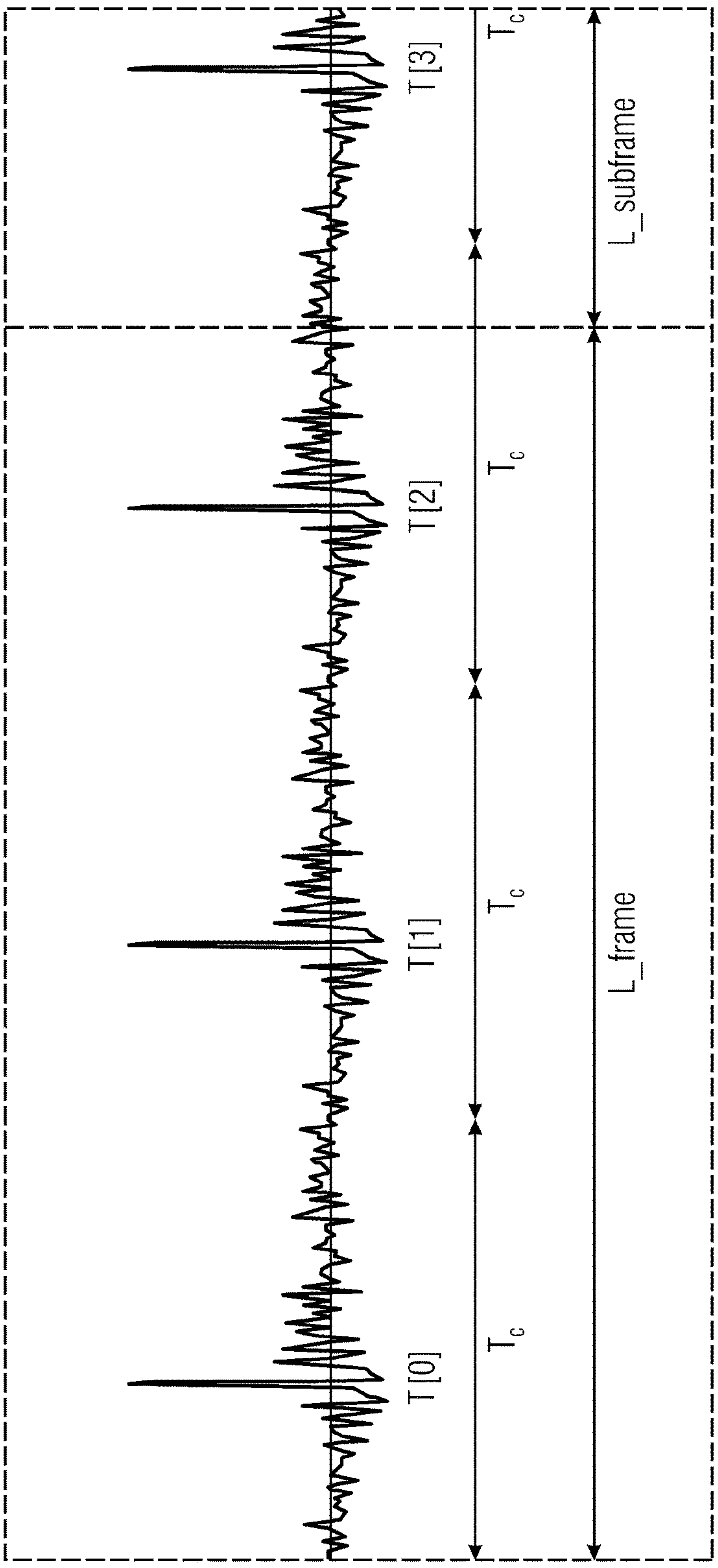
FIG 4 Prior Art
FIG. 4 illustrates a speech signal having three pulses within a frame.
Figure 5:
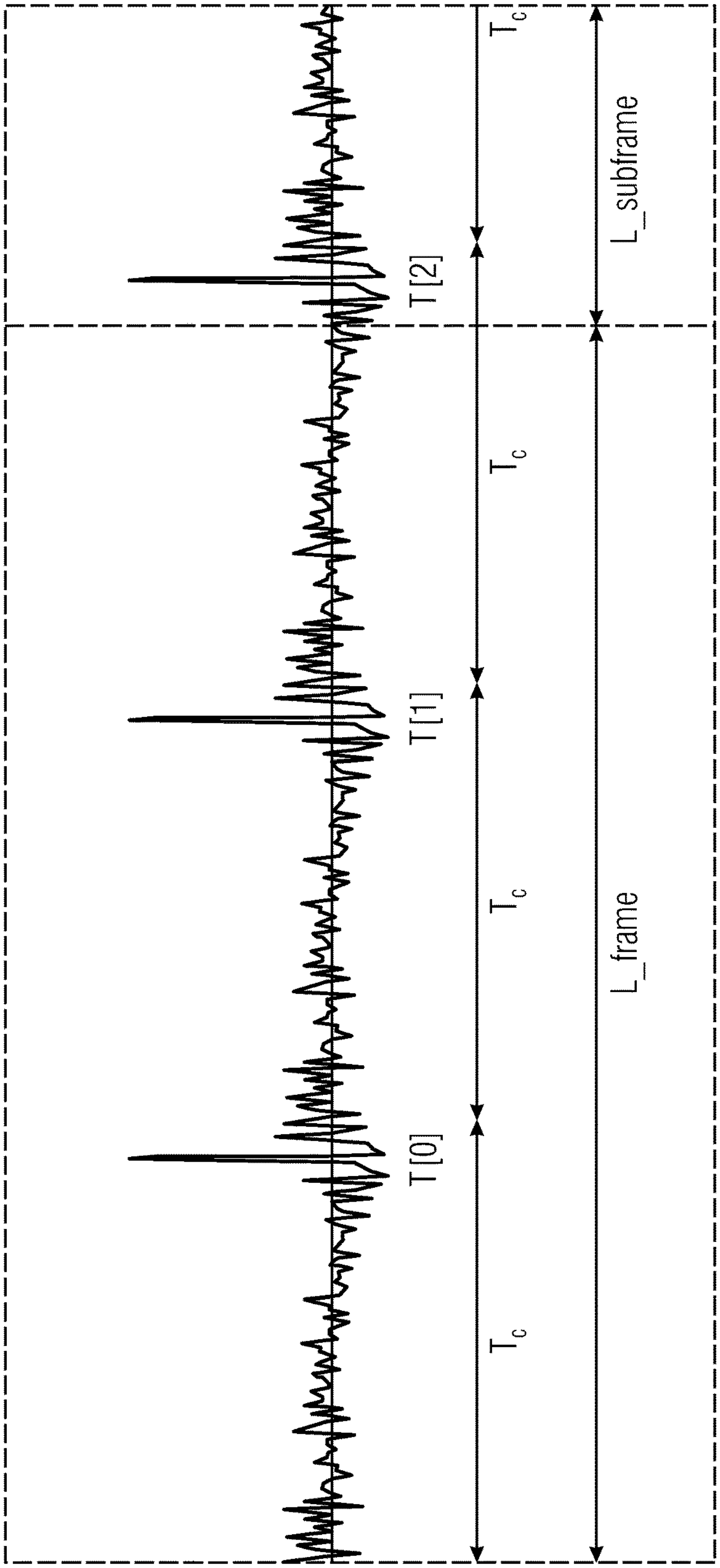
FIG 5 Prior Art
FIG. 5 illustrates a speech signal having two pulses within a frame.
Figure 6:
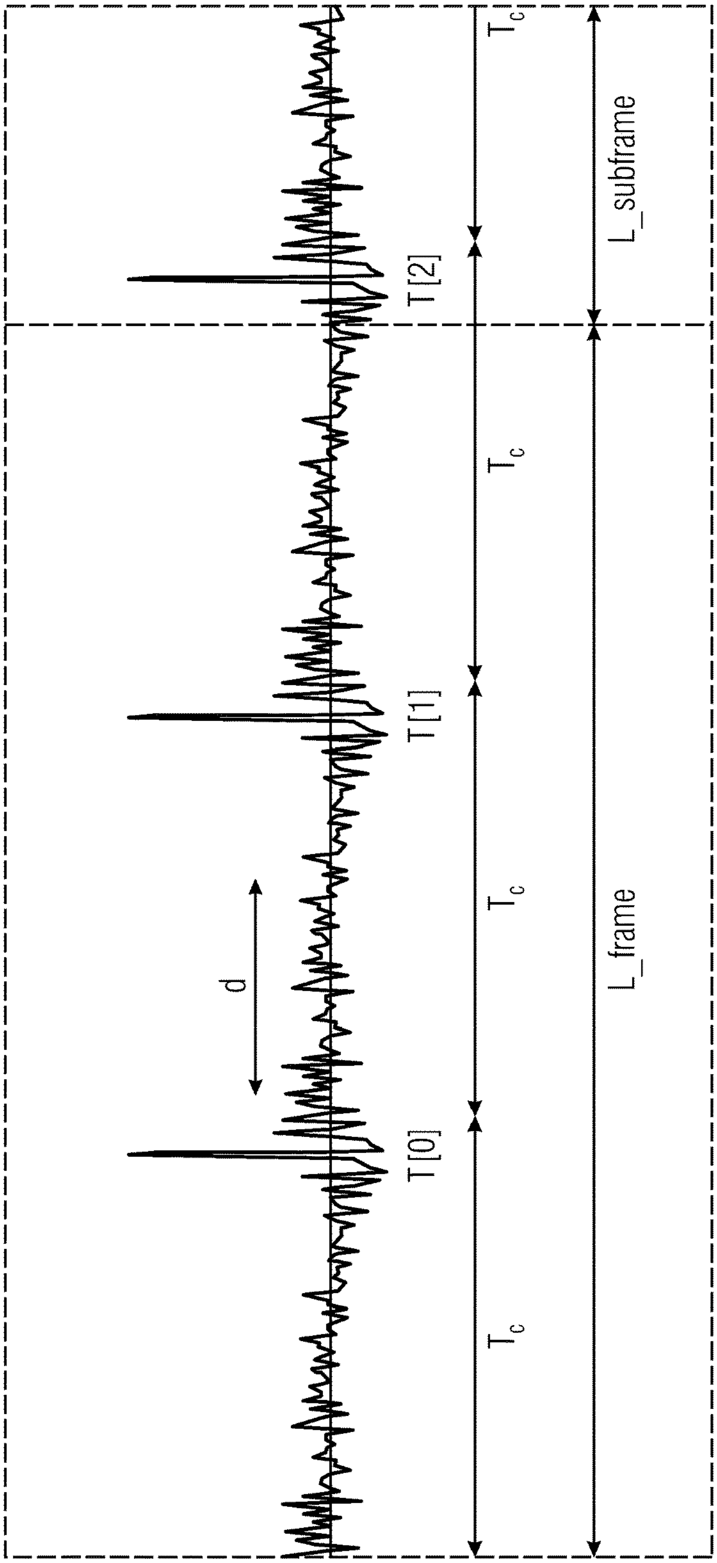
FIG 6 Prior Art
FIG. 6 illustrates a speech signal before a removal of samples.
Figure 7:
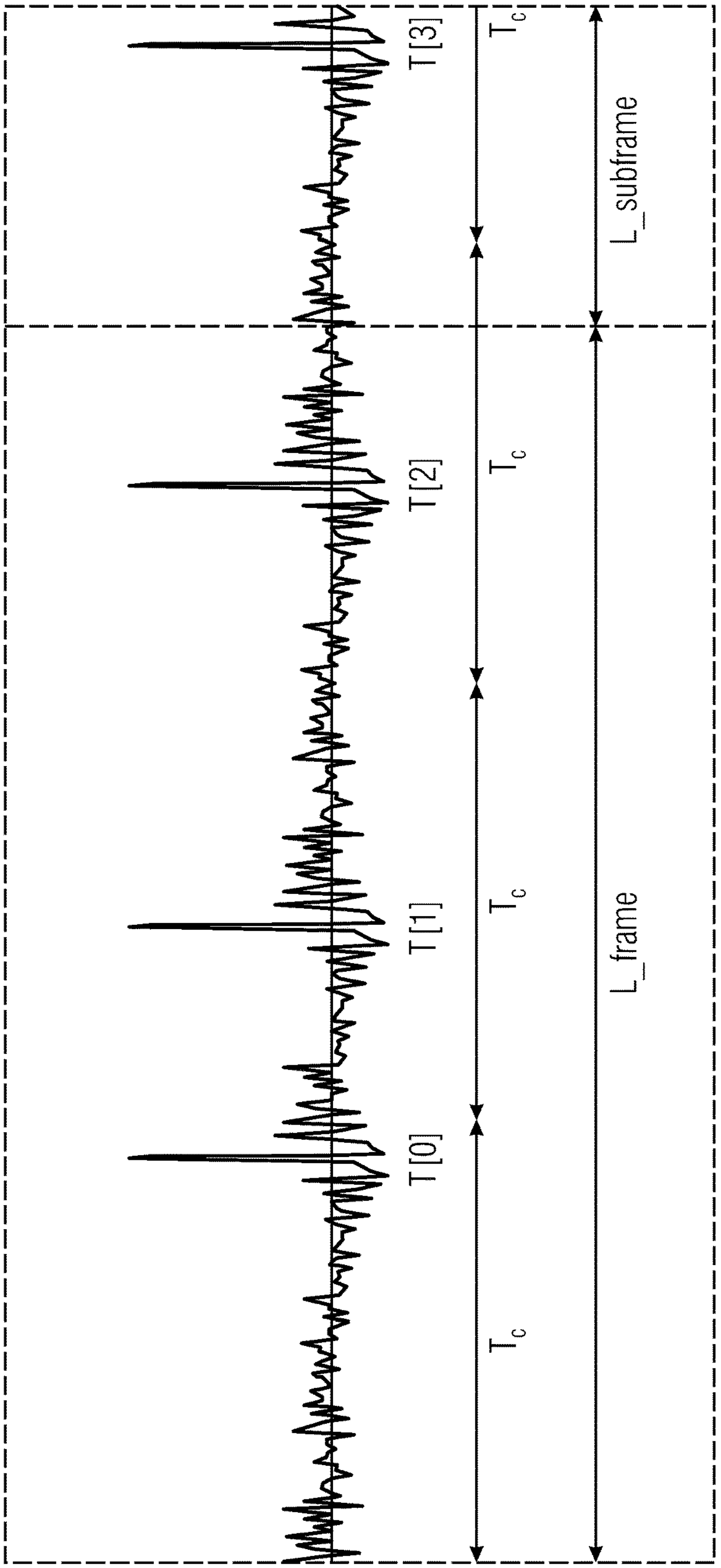
FIG 7 Prior Art
FIG. 7 illustrates the speech signal of FIG. 6 after the removal of samples.

According to this formula, N may be calculated for the examples illustrated by FIG. 4 and FIG. 5.

In the following, a concept without explicit search for the last pulse, but taking pulse positions into account, is described. Such a concept that does not need N, the last pulse index in the constructed periodic part.

Actual last pulse position in the constructed periodic part of the excitation (T[k]) determines the number of the full pitch cycles k, where samples are removed (or added).

Figure 12:
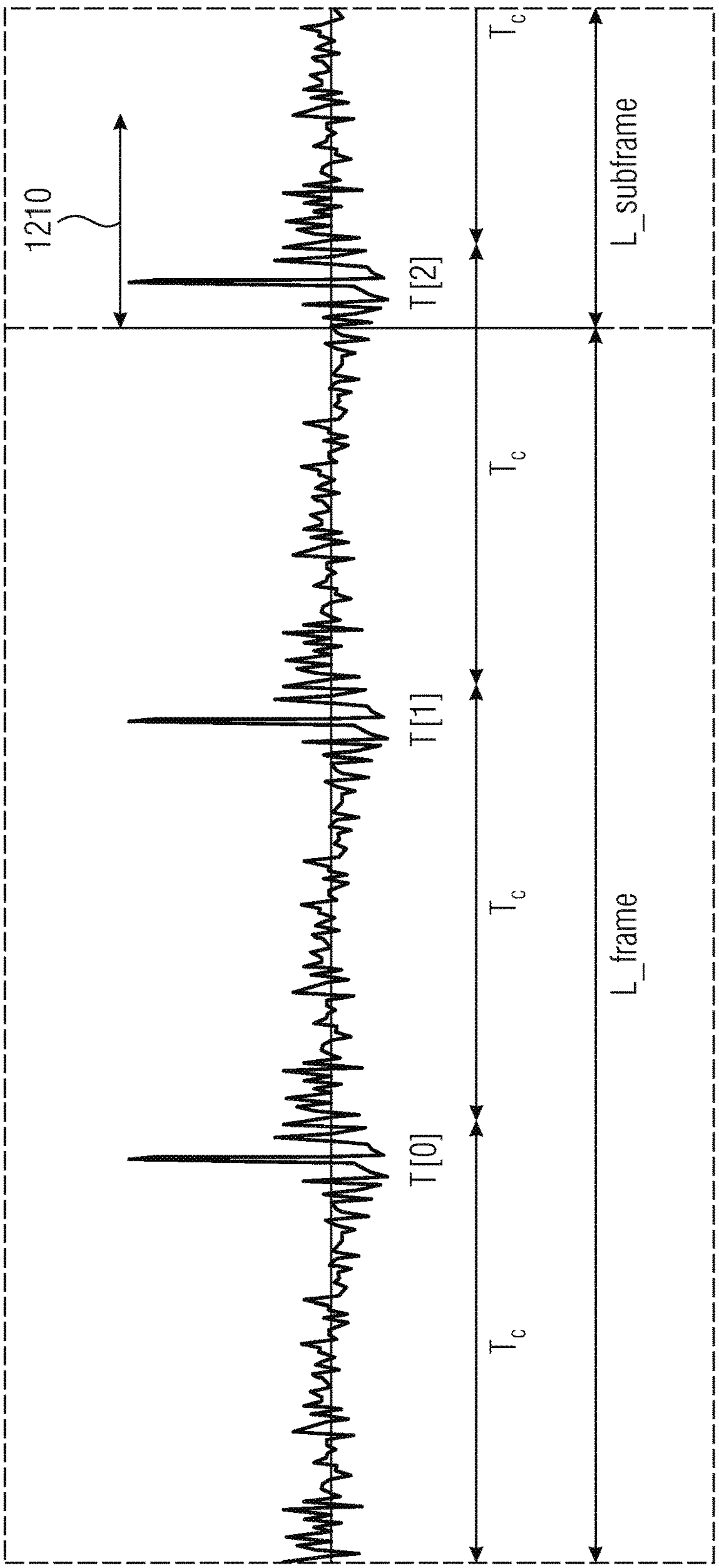
FIG. 12 illustrates a speech signal before removing samples.

FIG. 12 illustrates a position of the last pulse T[2] before removing d samples. Regarding the embodiments described with respect to formulae (25)-(63), reference sign 1210 denotes d.

In the example of FIG. 12, the index of the last pulse k is 2 and there are two full pitch cycles from which the samples should be removed.

After removing d samples from the signal of length L_frame+d, there are no samples from the original signal beyond L_frame+d samples. Thus T[k] is within L_frame+d samples and k is thus determined by $$k=i\,|\,T[i]<L_{frame}+d\leq T[i+1] \quad (28)$$

From formula (17) and formula (28), it follows that $$T[0]+kT_c<L_{frame}+d\leq T[0]+(k+1)T_c \quad (29)$$

That is $$\frac{L_{frame}+d-T[0]}{T_c}-1\leq k<\frac{L_{frame}+d-T[0]}{T_c} \quad (30)$$

From formula (30) it follows that $$k=\left\lceil\frac{L_{frame}+d-T[0]}{T_c}-1\right\rceil \quad (31)$$

In a codec that, e.g., uses frames of at least 20 ms and, where the lowest fundamental frequency of speech is, e.g., at least 40 Hz, in most cases at least one pulse exists in the concealed frame other than UNVOICED.

In the following, a case with at least two pulses (k≥1) is described with reference to formulae (32)-(46).

Assume that in each full $i^{th}$ pitch cycle between pulses, $\Delta_i$ samples shall be removed, wherein $\Delta_i$ is defined as:

$$\Delta_i=\Delta+(i-1)a,\ 1\leq i\leq k, \quad (32)$$

where a is an unknown variable that needs to be expressed in terms of the known variables.

Assume that $\Delta_0$ samples shall be removed before the first pulse, wherein $\Delta_0$ is defined as:

$$\Delta_0=(\Delta-a)\frac{T[0]}{T_c} \quad (33)$$

Assume that $\Delta_{k+1}$ samples shall be removed after the last pulse, wherein $\Delta_{k+1}$ is defined as:

$$\Delta_{k+1}=(\Delta+ka)\frac{L+d-T[k]}{T_c} \quad (34)$$

The last two assumptions are in line with formula (32) taking into account the length of the partial first and last pitch cycles.

Each of the $\Delta_i$ values is a sample number difference. Moreover, $\Delta_0$ is a sample number difference. Furthermore, $\Delta_{k+1}$ is a sample number difference.

Figure 13:
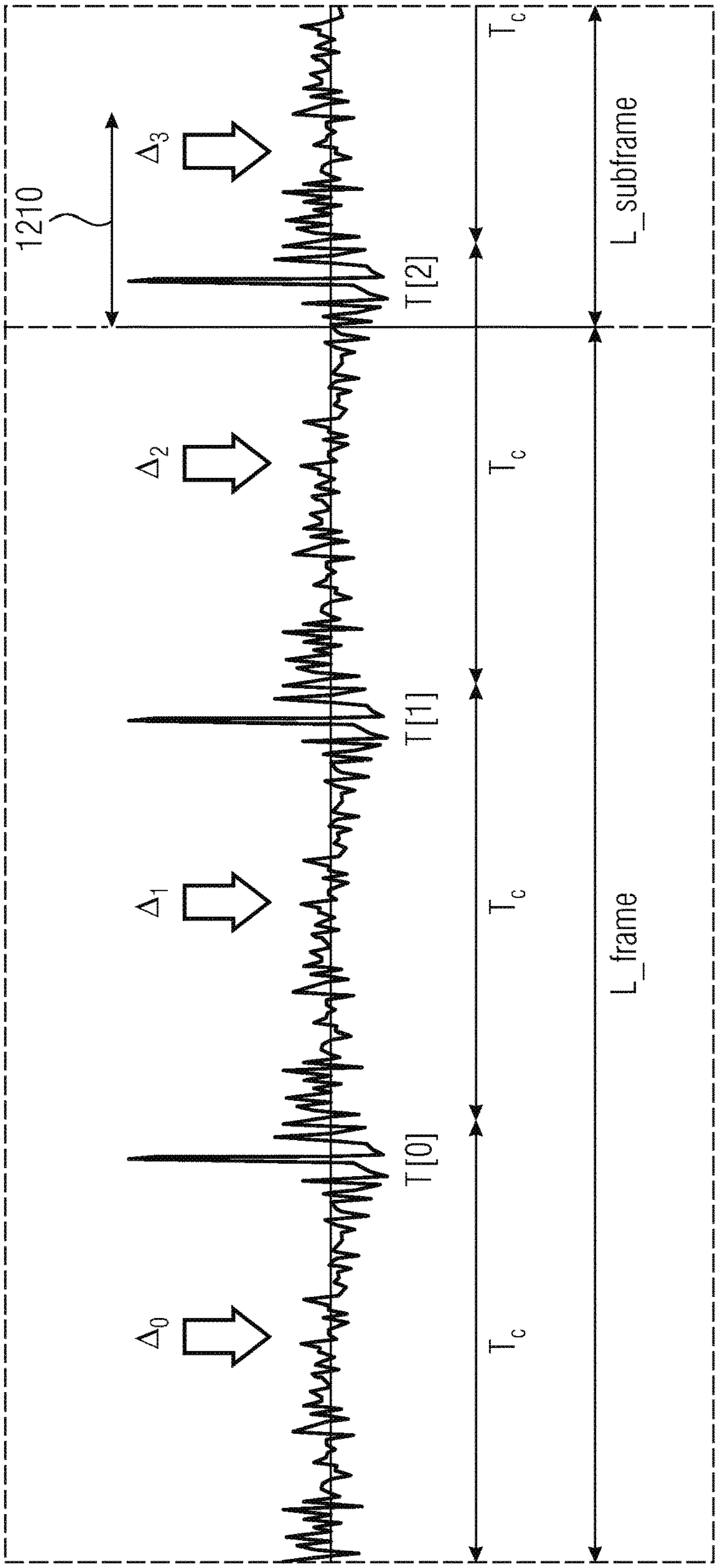
FIG. 13 illustrates the speech signal of FIG. 12, additionally illustrating $\Delta_0$ to $\Delta_3$.

FIG. 13 illustrates the speech signal of FIG. 12, additionally illustrating $\Delta_0$ to $\Delta_3$. The number of samples to be removed in each pitch cycle is schematically presented in the example in FIG. 13, where k=2. Regarding the embodiments described with reference to formulae (25)-(63), reference sign 1210 denotes d.

The total number of samples to be removed, d, is then related to as:

$$d=\sum_{i=0}^{k+1}\Delta_i \quad (35)$$

From formulae (32)-(35), d can be obtained as:

$$d=(\Delta-a)\frac{T[0]}{T_c}+(\Delta+ka)\frac{L+d-T[k]}{T_c}+\sum_{i=1}^{k}(\Delta+(i-1)a) \tag{36}$$

Formula (36) is equivalent to:

$$d=\Delta\left(\frac{T[0]}{T_c}+\frac{L+d-T[k]}{T_c}+k\right)+a\left(k\frac{L+d-T[k]}{T_c}-\frac{T[0]}{T_c}+\frac{k(k-1)}{2}\right) \tag{37}$$

Assume that the last full pitch cycle in a concealed frame has p[M−1] length, that is:

$$\Delta_k=T_c-p[M-1] \tag{38}$$

From formula (32) and formula (38) it follows that:

$$\Delta=T_c-p[M-1]-(k-1)a \tag{39}$$

Moreover, from formula (37) and formula (39), it follows that:

$$d=(T_c-p[M-1]+(1-k)a)\left(\frac{T[0]}{T_c}+\frac{L+d-T[k]}{T_c}+k\right)++a\left(k\frac{L+d-T[k]}{T_c}-\frac{T[0]}{T_c}+\frac{k(k-1)}{2}\right) \tag{40}$$

Formula (40) is equivalent to:

$$d=(T_c-p[M-1])\left(\frac{T[0]}{T_c}+\frac{L+d-T[k]}{T_c}+k\right)++a\left((1-k)\frac{T[0]}{T_c}+(1-k)\frac{L+d-T[k]}{T_c}++(1-k)k+k\frac{L+d-T[k]}{T_c}-\frac{T[0]}{T_c}+\frac{k(k-1)}{2}\right) \tag{41}$$

From formula (17) and formula (41), it follows that:

$$d=(T_c-p[M-1])\frac{L+d}{T_c}+a\left(-k\frac{T[0]}{T_c}+\frac{L+d-T[k]}{T_c}-\frac{k(k-1)}{2}\right) \tag{42}$$

Formula (42) is equivalent to:

$$dT_c=(T_c-p[M-1])(L+d)++a\left(-kT[0]+L+d-T[k]+\frac{k(1-k)}{2}T_c\right) \tag{43}$$

Furthermore, from formula (43), it follows that:

$$a=\frac{dT_c-(T_c-p[M-1])(L+d)}{-kT[0]+L+d-T[k]+\frac{k(1-k)}{2}T_c} \tag{44}$$

Formula (44) is equivalent to:

$$a=\frac{p[M-1\}(L+d)-T_cL}{L+d-(k+1)T[0]-kT_c+\frac{k(1-k)}{2}T_c} \tag{45}$$

Moreover, formula (45) is equivalent to:

$$a=\frac{p[M-1](L+d)-T_cL}{L+d-(k+1)T[0]-\frac{k(1-k)}{2}T_c} \tag{46}$$

According to embodiments, it is now calculated based on formulae (32)-(34), (39) and (46), how many samples are to be removed or added before the first pulse, and/or between pulses and/or after the last pulse.

In an embodiment, the samples are removed or added in the minimum energy regions.

According to embodiments, the number of samples to be removed may, for example, be rounded using:

$$\Delta_0'=\lfloor\Delta_0\rfloor$$

$$\Delta_i'=\lfloor\Delta_i+\Delta_{i-1}-\Delta_{i-1}'\rfloor,\ 0<i\le k$$

$$\Delta_{k+1}=d-\sum_{i=0}^{k}\Delta_i$$

In the following, a case with one pulse (k=0) is described with reference to formulae (47)-(55).

If there is just one pulse in the concealed frame, then $\Delta_0$ samples are to be removed before the pulse:

$$\Delta_0=(\Delta-a)\frac{T[0]}{T_c} \tag{47}$$

wherein Δ and a are unknown variables that need to be expressed in terms of the known variables. $\Delta_1$ samples are to be removed after the pulse, where:

$$\Delta_1=\Delta\frac{L+d-T[0]}{T_c} \tag{48}$$

Then the total number of samples to be removed is given by:

$$d=\Delta_0+\Delta_1 \tag{49}$$

From formulae (47)-(49), it follows that:

$$d=(\Delta-a)\frac{T[0]}{T_c}+\Delta\frac{L+d-T[0]}{T_c} \tag{50}$$

Formula (50) is equivalent to:

$$dT_c=\Delta(L+d)-aT[0] \tag{51}$$

It is assumed that the ratio of the pitch cycle before the pulse to the pitch cycle after the pulse is the same as the ratio between the pitch lag in the last subframe and the first subframe in the previously received frame:

$$\frac{\Delta}{\Delta - a} = \frac{p[-1]}{p[-4]} = r \tag{52}$$

From formula (52), it follows that:

$$a = \Delta\left(1 - \frac{1}{r}\right) \tag{53}$$

Moreover, from formula (51) and formula (53), it follows that:

$$dT_c = \Delta(L+d) - \Delta\left(1 - \frac{1}{r}\right)T[0] \tag{54}$$

Formula (54) is equivalent to:

$$\Delta = \frac{dT_c}{L + d + \left(\frac{1}{r} - 1\right)T[0]} \tag{55}$$

There are $\lfloor\Delta-a\rfloor$ samples to be removed or added in the minimum energy region before the pulse and $d-\lfloor\Delta-a\rfloor$ samples after the pulse.

In the following, a simplified concept according to embodiments, which does not necessitate a search for (the location of) pulses, is described with reference to formulae (56)-(63).

$t[i]$ denotes the length of the $i^{th}$ pitch cycle. After removing d samples from the signal, k full pitch cycles and one partial (up to full) pitch cycle are obtained.

Thus:

$$\sum_{i=0}^{k-1} t[i] < L \le \sum_{i=0}^{k} t[i] \tag{56}$$

As pitch cycles of length $t[i]$ are obtained from the pitch cycle of length $T_c$ after removing some samples, and as the total number of removed samples is d, it follows that $$kT_c < L+d \le (k+1)T_c \tag{57}$$

It follows that:

$$\frac{L+d}{T_c} - 1 \le k < \frac{L+d}{T_c} \tag{58}$$

Moreover, it follows that $$k = \left\lceil \frac{L+d}{T_c} \right\rceil - 1 \tag{59}$$

According to embodiments, a linear change in the pitch lag may be assumed:

$$t[i] = T_c - (i+1)\Delta,\ 0 \le i \le k$$

In embodiments, $(k+1)\Delta$ samples are removed in the $k^{th}$ pitch cycle.

According to embodiments, in the part of the $k^{th}$ pitch cycle, that stays in the frame after removing the samples, $$\frac{L+d-kT_c}{T_c}(k+1)\Delta \text{ samples}$$

are removed.

Thus, the total number of the removed samples is:

$$d = \frac{L+d-kT_c}{T_c}(k+1)\Delta + \sum_{i=0}^{k-1}(i+1)\Delta \tag{60}$$

Formula (60) is equivalent to:

$$d = \frac{L+d-kT_c}{T_c}(k+1)\Delta + \frac{k(k+1)}{2}\Delta \tag{61}$$

Moreover, formula (61) is equivalent to:

$$\frac{d}{(k+1)} = \left(\frac{L+d-kT_c}{T_c} + \frac{k}{2}\right)\Delta \tag{62}$$

Furthermore, formula (62) is equivalent to:

$$\Delta = \frac{2dT_c}{(k+1)(2L+2d-kT_c)} \tag{63}$$

According to embodiments, $(i+1)\Delta$ samples are removed at the position of the minimum energy. There is no need to know the location of pulses, as the search for the minimum energy position is done in the circular buffer that holds one pitch cycle.

If the minimum energy position is after the first pulse and if samples before the first pulse are not removed, then a situation could occur, where the pitch lag evolves as $(T_c+\Delta)$, $T_c$, $T_c$, $(T_c-\Delta)$, $(T_c-2\Delta)$ (two pitch cycles in the last received frame and three pitch cycles in the concealed frame). Thus, there would be a discontinuity. The similar discontinuity may arise after the last pulse, but not at the same time when it happens before the first pulse.

On the other hand, the minimum energy region would appear after the first pulse more likely, if the pulse is closer to the concealed frame beginning. If the first pulse is closer to the concealed frame beginning, it is more likely that the last pitch cycle in the last received frame is larger than $T_c$. To reduce the possibility of the discontinuity in the pitch change, weighting should be used to give advantage to minimum regions closer to the beginning or to the end of the pitch cycle.

According to embodiments, an implementation of the provided concepts is described, which implements one or more or all of the following method steps:

1. Store, in a temporary buffer B, low pass filtered $T_c$ samples from the end of the last received frame, searching in parallel for the minimum energy region. The temporary buffer is considered as a circular buffer when searching for the minimum energy region. (This may mean that the minimum energy region may consist of few samples from the beginning and few samples from the end of the pitch cycle.) The minimum energy region may, e.g., be the location of the minimum for the sliding window of length $\lceil (k+1)\Delta \rceil$ samples. Weighting may, for example, be used, that may, e.g., give advantage to the minimum regions closer to the beginning of the pitch cycle.

2. Copy the samples from the temporary buffer B to the frame, skipping $\lfloor \Delta \rfloor$ samples at the minimum energy region. Thus, a pitch cycle with length t [0] is created. Set $\delta_0=\Delta-\lfloor \Delta \rfloor$.
3. For the $i^{th}$ pitch cycle ($0<i<k$), copy the samples from the $(i-1)^{th}$ pitch cycles, skipping $\lfloor \Delta \rfloor+\lfloor \delta_{i-1} \rfloor$ samples at the minimum energy region. Set $\delta_i=\delta_{i-1}-\lfloor \delta_{i-1} \rfloor+\Delta-\lfloor \Delta \rfloor$. Repeat this step k−1 times.
4. For $k^{th}$ pitch cycle search for the new minimum region in the $(k-1)^{nd}$ pitch cycle using weighting that gives advantage to the minimum regions closer to the end of the pitch cycle. Then copy the samples from the $(k-1)^{nd}$ pitch cycle, skipping $$d-\left\lfloor \frac{k(k+1)}{2}\Delta+\frac{k(k-1)}{2}\Delta \right\rfloor = d-\lfloor k^2\Delta \rfloor$$

samples at the minimum energy region.

If samples have to be added, the equivalent procedure can be used by taking into account that $d<0$ and $\Delta<0$ and that we add in total $|d|$ samples, that is $(k+1)|\Delta|$ samples are added in the $k^{th}$ cycle at the position of the minimum energy.

The fractional pitch can be used at the subframe level to derive d as described above with respect to the "fast algorithm for determining d approach", as anyhow the approximated pitch cycle lengths are used.

In the following, a second group of pulse resynchronization embodiments is described with reference to formulae (64)-(113). These embodiments of the first group employ the definition of formula (15b), $$T_r=\lfloor T_p+0.5 \rfloor$$

wherein the last pitch period length is $T_p$, and the length of the segment that is copied is $T_r$.

If some parameters used by the second group of pulse resynchronization embodiments are not defined below, embodiments of the present invention may employ the definitions provided for these parameters with respect to the first group of pulse resynchronization embodiments defined above (see formulae (25)-(63)).

Some of the formulae (64)-(113) of the second group of pulse resynchronization embodiments may redefine some of the parameters already used with respect to the first group of pulse resynchronization embodiments. In this case, the provided redefined definitions apply for the second pulse resynchronization embodiments.

As described above, according to some embodiments, the periodic part may, e.g., be constructed for one frame and one additional subframe, wherein the frame length is denoted as $L=L_{frame}$L=L_frame.

For example, with M subframes in a frame, the subframe length is $$\text{L\_subfr}=\frac{L}{M}.$$

As already described, T [0] is the location of the first maximum pulse in the constructed periodic part of the excitation. The positions of the other pulses are given by:

$$T[i]=T[0]+i\ T_r.$$

According to embodiments, depending on the construction of the periodic part of the excitation, for example, after the construction of the periodic part of the excitation, the glottal pulse resynchronization is performed to correct the difference between the estimated target position of the last pulse in the lost frame ($P^P$), and its actual position in the constructed periodic part of the excitation ($T[k]^{T[k]}$).

The estimated target position of the last pulse in the lost frame (P) may, for example, be determined indirectly by the estimation of the pitch lag evolution. The pitch lag evolution is, for example, extrapolated based on the pitch lags of the last seven subframes before the lost frame. The evolving pitch lags in each subframe are:

$$p[i]=T_p+(i+1)\delta, 0\le i<M \tag{64}$$

where $$\delta=\frac{T_{ext}-T_p}{M} \tag{65}$$

and $T_{ext}T_{ext}$ is the extrapolated pitch and i is the subframe index. The pitch extrapolation can be done, for example, using weighted linear fitting or the method from G.718 or the method from G.729.1 or any other method for the pitch interpolation that, e.g., takes one or more pitches from future frames into account. The pitch extrapolation can also be non-linear. In an embodiment, $T_{ext}$ may be determined in the same way as $T_{ext}$ is determined above.

The difference within a frame length between the sum of the total number of samples within pitch cycles with the evolving pitch (p[i]) and the sum of the total number of samples within pitch cycles with the constant pitch ($T_p$) is denoted as s.

According to embodiments, if $T_{ext}>T_p$ then s samples should be added to a frame, and if $T_{ext}<T_p$ then −s samples should be removed from a frame. After adding or removing |s| samples, the last pulse in the concealed frame will be at the estimated target position (P).

If $T_{ext}=T_p$, there is no need for an addition or a removal of samples within a frame.

According to some embodiments, the glottal pulse resynchronization is done by adding or removing samples in the minimum energy regions of all of the pitch cycles.

In the following, calculating parameter s according to embodiments is described with reference to formulae (66)-(69).

According to some embodiments, the difference, s, may, for example, be calculated based on the following principles:

In each subframe i, $p[i]-T_r$ samples for each pitch cycle (of length $T_r$) should be added (if $p[i]-T_r>0$); (or $T_r-p[i]$ samples should be removed if $p[i]-T_r<0$).

There are $$\frac{\text{L\_subfr}}{T_r}=\frac{L}{MT_r}\frac{\text{L\_subfr}}{T_r}=\frac{L}{MT_r}$$

pitch cycles in each subframe.

Thus in i-th subframe $(p[i]-T_r)L/MT_r$ samples should be removed.

Therefore, in line with formula (64), according to an embodiment, s may, e.g., be calculated according to formula (66):

$$s = \sum_{i=0}^{M-1} (p[i] - T_r)\frac{L}{MT_r} = \sum_{i=0}^{M-1} (T_p + (i+1)\delta - T_r)\frac{L}{MT_r} == \frac{L}{MT_r}\sum_{i=0}^{M-1} ((i+1)\delta + T_p - T_r) \tag{66}$$

Formula (66) is equivalent to:

$$s = \frac{L}{MT_r}\left(M(T_p - T_r) + \delta\sum_{i=0}^{M-1} (i+1)\right) = \frac{L}{MT_r}\left(M(T_p - T_r) + \delta\frac{M(M+1)}{2}\right), \tag{67}$$

wherein formula (67) is equivalent to:

$$s = \frac{L}{T_r}\left(T_p = T_r + \delta\frac{(M+1)}{2}\right) = \frac{L}{T_r}\delta\frac{M+1}{2} + \frac{L}{T_r}(T_p - T_r), \tag{68}$$

and wherein formula (68) is equivalent to:

$$s = \delta\frac{L}{T_r}\frac{M+1}{2} - L\left(1 - \frac{T_p}{T_r}\right) \tag{69}$$

Note that s is positive if $T_{ext}>T_p$ $^{T_{ext}<T_p}$ and samples should be added, and that s is negative if $T_{ext}>T_p$ $^{T_{ext}<T_p}$ and samples should be removed. Thus, the number of samples to be removed or added can be denoted as |s|.

In the following, calculating the index of the last pulse according to embodiments is described with reference to formulae (70)-(73).

The actual last pulse position in the constructed periodic part of the excitation (T[k]) determines the number of the full pitch cycles k, $^k$ where samples are removed (or added).

FIG. 12 illustrates a speech signal before removing samples.

In the example illustrated by FIG. 12, the index of the last pulse k$^k$ is 2 and there are two full pitch cycles from which the samples should be removed. Regarding the embodiments described with reference to formulae (64)-(113), reference sign 1210 denotes |s|.

After removing |s| samples from the signal of length L−s, where L=L_frame, or after adding |s| samples to the signal of length L−s, there are no samples from the original signal beyond L−s samples. It should be noted that s is positive if samples are added and that s is negative if samples are removed. Thus L−s<L if samples are added and L−s>L if samples are removed. Thus T [k]$^{T[k]}$ has to be within L−s samples and k is thus determined by:

$$k = i|T|[i] < L - s \le T[i+1] \tag{70}$$

From formula (15b) and formula (70), it follows that $$T[0] + kT_r < L - s \le T[0] + (k+1)T_r \tag{71}$$

That is $$\frac{L - s - T[0]}{T_r} - 1 \le k < \frac{L - s - T[0]}{T_r} \tag{72}$$

According to an embodiment, k may, e.g., be determined based on formula (72) as:

$$k = \left\lceil \frac{L - s - T[0]}{T_r} - 1 \right\rceil \tag{73}$$

For example, in a codec employing frames of, for example, at least 20 ms, and employing a lowest fundamental frequency of speech of at least 40 Hz, in most cases at least one pulse exists in the concealed frame other than UNVOICED.

In the following, calculating the number of samples to be removed in minimum regions according to embodiments is described with reference to formulae (74)-(99).

It may, e.g., be assumed that $\Delta_i$ $_{\Delta_i}$ samples in each full i$^{th}$ $^{i_{th}}$ pitch cycle between pulses shall be removed (or added), where $\Delta_i$ is defined as $$\Delta_i = \Delta + (i-1)a, \ 1 \le i \le k \tag{74}$$

and where a is an unknown variable that may, e.g., be expressed in terms of the known variables.

Moreover, it may, e.g., be assumed that $\Delta_0^p$ samples shall be removed (or added) before the first pulse, $\Delta_0^p$, where $\Delta_0^p$ is defined as:

$$\Delta_0^p = \Delta_0\frac{T[0]}{T_r} = (\Delta - a)\frac{T[0]}{T_r} \tag{75}$$

Furthermore, it may, e.g., be assumed that $\Delta_{k+1}^p$ samples after the last pulse shall be removed (or added), where $\Delta_{k+1}^p$ is defined as:

$$\Delta_{k+1}^p = \Delta_{k+1}\frac{L - s - T[k]}{T_r} = (\Delta + ka)\frac{L - s - T[k]}{T_r} \tag{76}$$

The last two assumptions are in line with formula (74) taking the length of the partial first and last pitch cycles into account.

The number of samples to be removed (or added) in each pitch cycle is schematically presented in the example in FIG. 13, where k=2. FIG. 13 illustrates a schematic representation of samples removed in each pitch cycle. Regarding the embodiments described with reference to formulae (64)-(113), reference sign 1210 denotes |s|

The total number of samples to be removed (or added), s, is related to $\Delta_i$ according to:

$$|s| = \Delta_0^p + \Delta_{k+1}^p + \sum_{i=1}^{k} \Delta_i \tag{77}$$

From formulae (74)-(77) it follows that:

$$|s| = (\Delta - a)\frac{T[0]}{T_r} + (\Delta + ka)\frac{L - s - T[k]}{T_r} + \sum_{i=1}^{k} (\Delta + (i-1)a) \tag{78}$$

Formula (78) is equivalent to:

$$|s| = (\Delta - a)\frac{T[0]}{T_r} + (\Delta + ka)\frac{L-s-T[k]}{T_r} + k\Delta + a\sum_{i=1}^{k}(i-1) \tag{79}$$

Moreover, formula (79) is equivalent to:

$$|s| = (\Delta - a)\frac{T[0]}{T_r} + (\Delta + ka)\frac{L-s-T[k]}{T_r} + k\Delta + a\frac{k(k-1)}{2} \tag{80}$$

Furthermore, formula (80) is equivalent to:

$$|s| = \Delta\left(\frac{T[0]}{T_r} + \frac{L-s-T[k]}{T_r} + k\right) + a\left(k\frac{L-s-T[k]}{T_r} - \frac{T[0]}{T_r} + \frac{k(k-1)}{2}\right) \tag{81}$$

Moreover, taking formula (16b) into account formula (81) is equivalent to:

$$|s| = \Delta\left(\frac{L-s}{T_r}\right) + a\left(k\frac{L-s-T[k]}{T_r} - \frac{T[0]}{T_r} + \frac{k(k-1)}{2}\right) \tag{82}$$

According to embodiments, it may be assumed that the number of samples to be removed (or added) in the complete pitch cycle after the last pulse is given by:

$$\Delta_{k+1}=|T_r-p[M-1]|=|T_r-T_{ext}| \tag{83}$$

From formula (74) and formula (83), it follows that:

$$\Delta=|T_r-T_{ext}|-ka \tag{84}$$

From formula (82) and formula (84), it follows that:

$$|s| = (|T_r - T_{ext}| - ka)\left(\frac{L-s}{T_r}\right) + a\left(k\frac{L-s-T[k]}{T_r} - \frac{T[0]}{T_r} + \frac{k(k-1)}{2}\right) \tag{85}$$

Formula (85) is equivalent to:

$$|s| = |T_r - T_{ext}|\left(\frac{L-s}{T_r}\right) + a\left(-k\frac{L-s}{T_r} + k\frac{L-s-T[k]}{T_r} - \frac{T[0]}{T_r} + \frac{k(k-1)}{2}\right) \tag{86}$$

Moreover, formula (86) is equivalent to:

$$|s| = |T_r - T_{ext}|\left(\frac{L-s}{T_r}\right) + a\left(-k\frac{T[k]}{T_r} - \frac{T[0]}{T_r} + \frac{k(k-1)}{2}\right) \tag{87}$$

Furthermore, formula (87) is equivalent to:

$$|s|T_r = |T_r - T_{ext}|(L-s) + a\left(-kT[k] - T[0] + \frac{k(k-1)}{2}T_r\right) \tag{88}$$

From formula (16b) and formula (88), it follows that:

$$|s|T_r = |T_r - T_{ext}|(L-s) + a\left(-kT[0] - k^2T_r - T[0] + \frac{k(k-1)}{2}T_r\right) \tag{89}$$

Formula (89) is equivalent to:

$$|s|T_r = |T_r - T_{ext}|(L-s) + a\left(-(k+1)T[0] - \frac{k(k+1)}{2}T_r\right) \tag{90}$$

Moreover, formula (90) is equivalent to:

$$|s|T_r - |T_r - T_{ext}|(L-s) = a\left(-(k+1)T[0] - \frac{k(k+1)}{2}T_r\right) \tag{91}$$

Furthermore, formula (91) is equivalent to:

$$|s|T_r - |T_r - T_{ext}|(L-s) = -(k+1)a\left(T[0] + \frac{k}{2}T_r\right) \tag{92}$$

Moreover, formula (92) is equivalent to:

$$|T_r - T_{ext}|(L-s) - |s|T_r = (k+1)a\left(T[0] + \frac{k}{2}T_r\right) \tag{93}$$

From formula (93), it follows that:

$$a = \frac{|T_r - T_{ext}|(L-s) - |s|T_r}{(k+1)\left(T[0] + \frac{k}{2}T_r\right)} \tag{94}$$

Thus, e.g., based on formula (94), according to embodiments:

- it is calculated how many samples are to be removed and/or added before the first pulse, and/or
- it is calculated how many samples are to be removed and/or added between pulses and/or
- it is calculated how many samples are to be removed and/or added after the last pulse.

According to some embodiments, the samples may, e.g., be removed or added in the minimum energy regions.

From formula (85) and formula (94) follows that:

$$\Delta_0^p = (\Delta - a)\frac{T[0]}{T_r} = (|T_r - T_{ext}| - ka - a)\frac{T[0]}{T_r} \tag{95}$$

Formula (95) is equivalent to:

$$\Delta_0^p = (\,|\,T_r - T_{ext}\,| - (k+1)a)\frac{T[0]}{T_r} \tag{96}$$

Moreover, from formula (84) and formula (94), it follows that:

$$\Delta_i=\Delta+(i-1)a=|T_r-T_{ext}|ka+(i-1)a,\ 1\le i\le k \tag{97}$$

Formula (97) is equivalent to:

$$\Delta_i|T_r-T_{ext}|-(k+1-i)a, 1\le i\le k \tag{98}$$

According to an embodiment, the number of samples to be removed after the last pulse can be calculated based on formula (97) according to:

$$\Delta_{k+1}^{P} = |s| - \Delta_0^P - \sum_{i=1}^{k} \Delta_i \tag{99}$$

It should be noted that according to embodiments, $\Delta_0^P$, $\Delta_i$ and $\Delta_{k+1}^P$ are positive and that the sign of s determines if the samples are to be added or removed.

Due to complexity reasons, in some embodiments, it is desired to add or remove integer number of samples and thus, in such embodiments, and $\Delta_0^P$, $\Delta_i$ and $\Delta_{k+1}^P$ may, e.g., be rounded. In other embodiments, other concepts using waveform interpolation may, e.g., alternatively or additionally be used to avoid the rounding, but with the increased complexity.

In the following, an algorithm for pulse resynchronization according to embodiments is described with reference to formulae (100)-(113).

According to embodiments, input parameters of such an algorithm may, for example, be:

$L^L$ Frame length

M Number of subframes $T_p$ Pitch cycle length at the end of the last received frame $T_{ext}$ $T_{ext}$ Pitch cycle length at the end of the concealed frame src_exc Input excitation signal that was created copying the low pass filtered last pitch cycle of the excitation signal from the end of the last received frame as described above.

dst_exc Output excitation signal created from src_exc using the algorithm described here for the pulse resynchronization.

According to embodiments, such an algorithm may comprise, one or more or all of the following steps:

Calculate pitch change per subframe based on formula (65):

$$\delta = \frac{T_{ext} - T_p}{M} \tag{100}$$

Calculate the rounded starting pitch based on formula (15b):

$$T_r = \lfloor T_r + 0.5 \rfloor \tag{101}$$

Calculate number of samples to be added (to be removed if negative) based on formula (69):

$$s = \delta \frac{L}{T_r} \frac{M+1}{2} - L\left(1 - \frac{T_p}{T_r}\right) \tag{102}$$

Find the location of the first maximum pulse T [0] among first $T_r$ samples in the constructed periodic part of the excitation src_exc.

Get the index of the last pulse in the resynchronized frame dst_exc based on formula (73):

$$k = \left\lceil \frac{L - s - T[0]}{T_r - 1} - 1 \right\rceil \tag{103}$$

Calculate a–the delta of the samples to be added or removed between consecutive cycles based on formula (94):

$$a = \frac{|T_r - T_{ext}|(L - s) - |s| T_r}{(k+1)\left(T[0] + \frac{k}{2} T_r\right)} \tag{104}$$

Calculate the number of samples to be added or removed before the first pulse based on formula (96):

$$\Delta_0^P = (|T_r - T_{ext}| - (k+1)a)\frac{T[0]}{T_r} \tag{105}$$

Round down the number of samples to be added or removed before the first pulse and keep in memory the fractional part:

$$\Delta'_0 = \lfloor \Delta_0^P \rfloor \tag{106}$$

$$F = \Delta_0^P - \Delta'_0 \tag{107}$$

For each region between two pulses, calculate the number of samples to be added or removed based on formula (98):

$$\Delta_i = |T_r - T_{ext}| - (k+1-i)a, \quad 1 \le i \le k \tag{108}$$

Round down the number of samples to be added or removed between two pulses, taking into account the remaining fractional part from the previous rounding:

$$\Delta'_i = \lfloor \Delta_i + F \rfloor \tag{109}$$

$$F = \Delta_i - \Delta'_i \tag{110}$$

If due to the added F for some i it happens that $\Delta'_i > \Delta'_{i-1}$ swap the values for $\Delta'_i$ and $\Delta'_{i-1}$.

Calculate the number of samples to be added or removed after the last pulse based on formula (99):

$$\Delta'_{k+1} = |\lfloor s + 0.5 \rfloor| - \sum_{i=0}^{k} \Delta'_i \tag{111}$$

Then, calculate the maximum number of samples to be added or removed among the minimum energy regions:

$$\Delta'_{max} = \max_i \Delta'_i = \begin{cases} \Delta'_k, & \Delta'_k \ge \Delta'_{k+1} \\ \Delta'_{k+1}, & \Delta'_k < \Delta'_{k+1} \end{cases} \tag{112}$$

Find the location of the minimum energy segment $P_{min}[1]$ between the first two pulses in src_exc, that has $\Delta'_{max}$ length. For every consecutive minimum energy segment between two pulses, the position is calculated by:

$$P_{min}[i] = P_{min}[1] + (i-1)T_r, \quad 1 < i \le k \tag{113}$$

If $P_{min}[1] > T_r$ then calculate the location of the minimum energy segment before the first pulse in src_exc using $P_{min}[0] = P_{min}[1] - T_r$. Otherwise find the location of the minimum energy segment $P_{min}[0]$ before the first pulse in src_exc, that has $\Delta'_0$ length.

If $P_{min}[1] + kT_r > L - s$ then calculate the location of the minimum energy segment after the last pulse in src_exc using $P_{min}[k+1] = P_{min}[1] + kT_r$. Otherwise find the location of the minimum energy segment $P_{min}[k+1]$ after the last pulse in src_exc, that has $\Delta'_{k+1}$ length.

If there will be just one pulse in the concealed excitation signal dst_exc, that is if $k^k$ is equal to 0, limit the search for $P_{min}[1]^{P_{min}[1]}$ to L−s. $P_{min}$ [1] then points to the location of the minimum energy segment after the last pulse in src_exc.

If s>0 add $\Delta'_i$ samples at location $P_{min}$ [i] for 0≤i≤k+1 to the signal src_exc and store it in dst_exc, otherwise if s<0 remove $\Delta'_i$ samples at location Pmin[i] for 0≤i≤k+1 from the signal src_exc and store it in dst_exc. There are k+2 regions where the samples are added or removed.

Figure 2C:
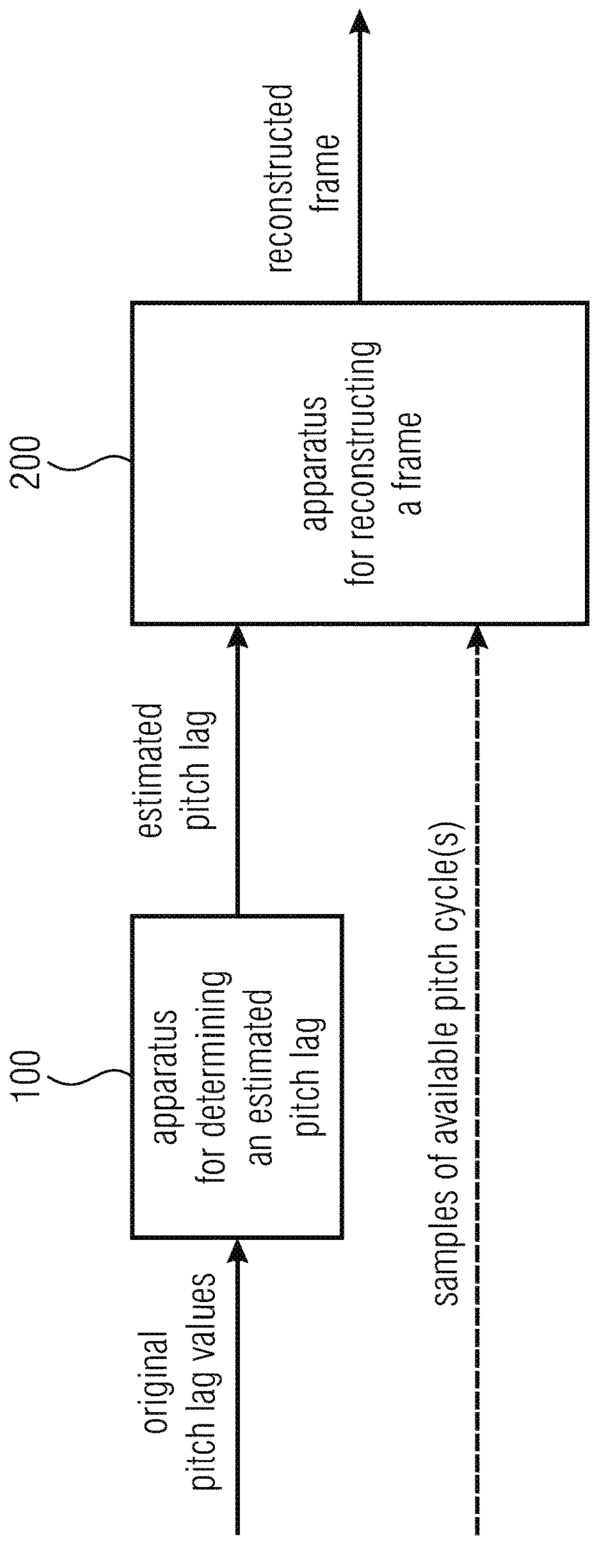
FIG. 2*c* illustrates a system for reconstructing a frame comprising a speech signal according to an embodiment.
Figure 3:
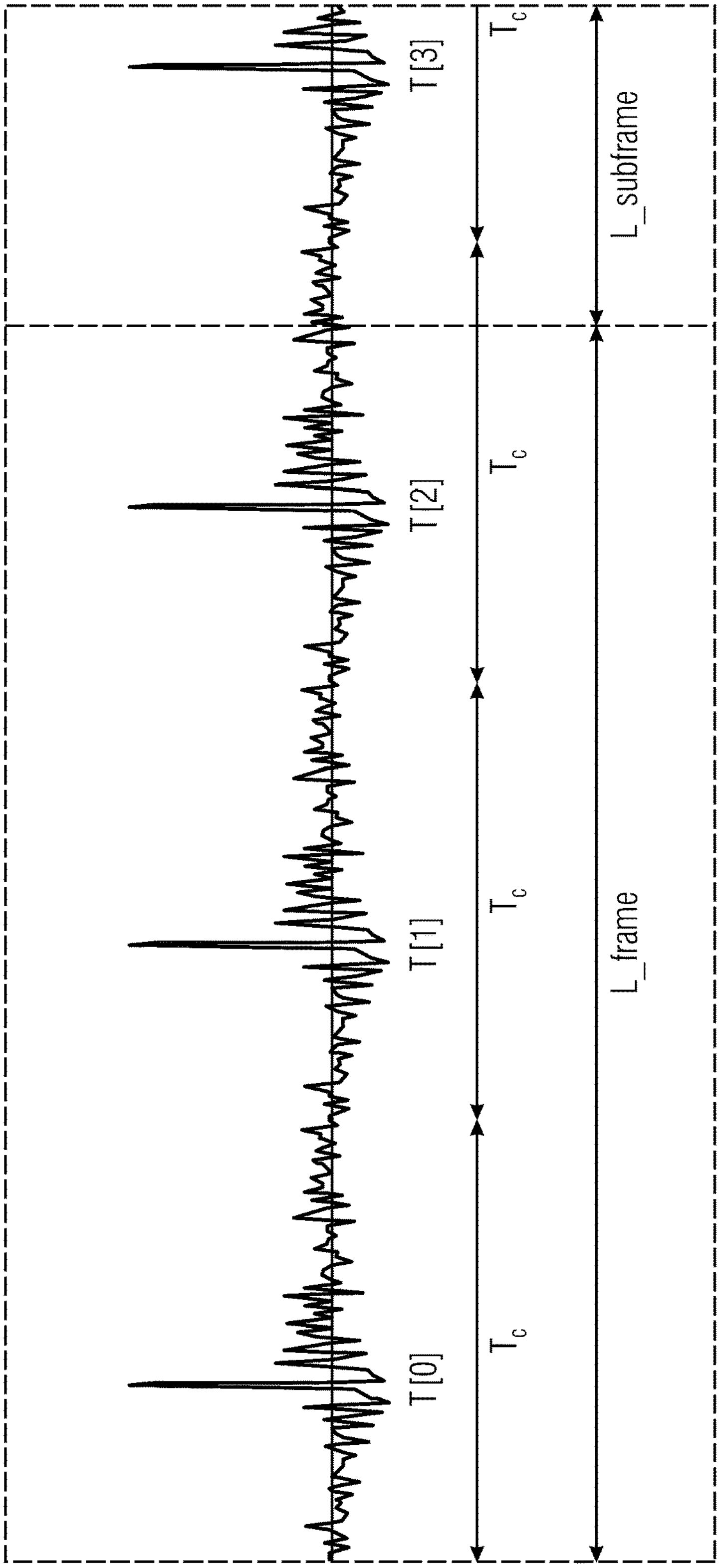
FIG 3 Prior Art
FIG. 3 illustrates a constructed periodic part of a speech signal.

FIG. 2*c* illustrates a system for reconstructing a frame comprising a speech signal according to an embodiment. The system comprises an apparatus 100 for determining an estimated pitch lag according to one of the above-described embodiments, and an apparatus 200 for reconstructing the frame, wherein the apparatus for reconstructing the frame is configured to reconstruct the frame depending on the estimated pitch lag. The estimated pitch lag is a pitch lag of the speech signal.

In an embodiment, the reconstructed frame may, e.g., be associated with one or more available frames, said one or more available frames being at least one of one or more preceding frames of the reconstructed frame and one or more succeeding frames of the reconstructed frame, wherein the one or more available frames comprise one or more pitch cycles as one or more available pitch cycles. The apparatus 200 for reconstructing the frame may, e.g., be an apparatus for reconstructing a frame according to one of the above-described embodiments.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for reconstructing a frame comprising a speech signal as a reconstructed frame, said reconstructed frame being associated with one or more available frames, said one or more available frames being one or more of one or more preceding frames of the reconstructed frame and one or more succeeding frames of the reconstructed frame, wherein the one or more available frames comprise one or more pitch cycles as one or more available pitch cycles, wherein the apparatus comprises:

a determination unit for determining a sample number difference indicating a difference between a number of samples of one of the one or more available pitch cycles and a number of samples of a first pitch cycle to be reconstructed, and a frame reconstructor for reconstructing the reconstructed frame by reconstructing, depending on the sample number difference and depending on the samples of said one of the one or more available pitch cycles, the first pitch cycle to be reconstructed as a first reconstructed pitch cycle, and wherein the frame reconstructor is configured to reconstruct the reconstructed frame, such that the reconstructed frame comprises the first reconstructed pitch cycle, such that the reconstructed frame comprises a second reconstructed pitch cycle, and such that the number of samples of the first reconstructed pitch cycle differs from a number of samples of the second reconstructed pitch cycle, wherein the frame reconstructor is adapted to generate an intermediate frame depending on said one of the one or more available pitch cycles, wherein the frame reconstructor is adapted to generate the intermediate frame so that the intermediate frame comprises a first partial intermediate pitch cycles, one or more further intermediate pitch cycles, and a second partial intermediate pitch cycle, wherein the first partial intermediate pitch cycle depends on one or more of the samples of said one of the one or more available pitch cycles, wherein each of the one or more further intermediate pitch cycles depends on all of the samples of said one of the one or more available pitch cycles of the preceding frame, and wherein the second partial intermediate pitch cycle depends on one or more of the samples of said one of the one or more available pitch cycles of the preceding frame or of the succeeding frame, wherein the determination unit is configured to determine a start portion difference number indicating how many samples are to be removed or added from the first partial intermediate pitch cycle, and wherein the frame reconstructor is configured to remove one or more first sample from the first partial intermediate pitch cycle, or is configured to add one or more first sample to the first partial intermediate pitch cycle depending on the start portion difference number, wherein the determination unit is configured to determine for each of the further intermediate pitch cycles a pitch cycle difference number indicating how many samples are to be removed or added from said one of the further intermediate pitch cycles, and wherein the frame reconstructor is configured to remove one or more second sample from said one of the further intermediate pitch cycles, or is configured to add one or more second sample to said one of the further intermediate pitch cycles depending on said pitch cycle difference number, and wherein the determination unit is configured to determine an end portion difference number indicating how many samples are to be removed or added from the second partial intermediate pitch cycle, and wherein the frame reconstructor is configured to remove one or more third sample from the second partial intermediate pitch cycle, or is configured to add one or more third sample to the second partial intermediate pitch cycle depending on the end portion difference number.

2. An apparatus according to claim 1, wherein the determination unit is configured to determine a sample number difference for each of a plurality of pitch cycles to be reconstructed, such that the sample number difference of each of the pitch cycles indicates a difference between the number of samples of said one of the one or more available pitch cycles and a number of samples of said pitch cycle to be reconstructed, and wherein the frame reconstructor is configured to reconstruct each pitch cycle of the plurality of pitch cycles to be reconstructed depending on the sample number difference of said pitch cycle to be reconstructed and depending on the samples of said one of the one or more available pitch cycles, to reconstruct the reconstructed frame.

3. An apparatus according to claim 1, wherein the determination unit is configured to determine a position of one or more pulses of the speech signal of the frame to be reconstructed as reconstructed frame, and wherein the frame reconstructor is configured to reconstruct the reconstructed frame depending on the position of the one or more pulses of the speech signal.

4. An apparatus according to claim 1, wherein the determination unit is configured to determine an index k of a last pulse of the speech signal of the frame to be reconstructed as the reconstructed frame such that $$k = \left\lceil \frac{L - s - T[0]}{T_r} - 1 \right\rceil,$$

wherein L indicates a number of samples of the reconstructed frame, wherein s indicates a frame difference value, wherein T [0] indicates a position of a pulse of the speech signal of the frame to be reconstructed as the reconstructed frame, being different from the last pulse of the speech signal, and wherein $T_r$ indicates a rounded length of said one of the one or more available pitch cycles, wherein the apparatus is configured to reconstruct the frame to be reconstructed as the reconstructed frame depending on the index k of the last pulse of the speech signal of the frame to be reconstructed as the reconstructed frame.

5. An apparatus according to claim 1, wherein the determination unit is configured to determine a rounded length $T_r$ of said one of the one or more available pitch cycles based on formula:

$$T_r = \lfloor T_p + 0.5 \rfloor$$

wherein $T_p$ indicates the length of said one of the one or more available pitch cycles, wherein the apparatus is configured to reconstruct the frame to be reconstructed as the reconstructed frame depending on the rounded length $T_r$ of said one of the one or more available pitch cycles.

6. An apparatus according to claim 1, wherein the determination unit is configured to determine a parameter s by applying the formula:

$$s = \delta \frac{L}{T_r} \frac{M+1}{2} - L\left(1 - \frac{T_p}{T_r}\right)$$

wherein $T_p$ indicates the length of said one of the one or more available pitch cycles, wherein $T_r$ indicates a rounded length of said one of the one or more available pitch cycles, wherein the frame to be reconstructed as the reconstructed frame comprises M subframes, wherein the frame to be reconstructed as the reconstructed frame comprises L samples, and wherein δ is a real number indicating a difference between a number of samples of said one of the one or more available pitch cycles and a number of samples of one of one or more pitch cycles to be reconstructed, wherein the apparatus is configured to reconstruct the frame to be reconstructed as the reconstructed frame depending on the parameter s.

7. An apparatus according to claim 1, wherein the apparatus is configured to reconstruct the frame to be reconstructed as the reconstructed frame depending on the formula:

$$\delta = \frac{T_{ext} - T_p}{M}$$

wherein the frame to be reconstructed as the reconstructed frame comprises M subframes, wherein $T_p$ indicates the length of said one of the one or more available pitch cycles, and wherein $T_{ext}$ indicates a length of one of the pitch cycles to be reconstructed of the frame to be reconstructed as the reconstructed frame.

8. An apparatus according to claim 1, wherein the frame reconstructor is adapted to generate the intermediate frame so that the intermediate frame comprises the first partial intermediate pitch cycle, more than one further intermediate pitch cycles as the one or more further intermediate pitch cycles, and the second partial intermediate pitch cycle, wherein the apparatus is configured to calculate the number of samples $\Delta_i$ to be removed from or added to each of the one or more further intermediate pitch cycles based on:

$$\Delta_i = |T_r - T_{ext}| - (k+1-i)a,\ 1 \le i \le k$$

wherein $T_r$ indicates a rounded length of said one of the one or more available pitch cycles, wherein $T_{ext}$ indicates a length of one of the pitch cycles to be reconstructed of the frame to be reconstructed as the reconstructed frame, wherein k indicates an index of a last pulse of the speech signal of the frame to be reconstructed as the reconstructed frame, wherein i is an integer, and wherein a is a number indicating a delta of the samples to be added or removed between consecutive pitch cycles.

9. An apparatus according to claim 8, wherein the apparatus is configured to determine the number a according to $$a = \frac{|T_r - T_{ext}|(L - s) - |s|T_r}{(k+1)\left(T[0] + \frac{k}{2}T_r\right)}$$

wherein L indicates a number of samples of the reconstructed frame, wherein s indicates a frame difference value, wherein T [0] indicates a position of a pulse of the speech signal of the frame to be reconstructed as the reconstructed frame, being different from the last pulse of the speech signal.

10. An apparatus according to claim 9, wherein the apparatus is configured to calculate the number of samples to be removed from or added to the first partial intermediate pitch cycle based on:

$$\Delta_0^p = (|T_r - T_{ext}| - (k+1)a)\frac{T[0]}{T_r}$$

wherein the apparatus is configured to calculate the number of samples to be removed from or added to the second partial intermediate pitch cycle based on:

$$\Delta_{k+1}^p = |s| - \Delta_0^p - \sum_{i=1}^{k} \Delta_i.$$

11. A method for reconstructing a frame comprising a speech signal as a reconstructed frame, said reconstructed frame being associated with one or more available frame, said one or more available frame being one or more of one or more preceding frame of the reconstructed frame and one or more succeeding frame of the reconstructed frame, wherein the one or more available frame comprises one or more pitch cycle as one or more available pitch cycle, wherein the method comprises:

determining a sample number difference indicating a difference between a number of samples of one of the one or more available pitch cycles and a number of samples of a first pitch cycle to be reconstructed, and reconstructing the reconstructed frame by reconstructing, depending on the sample number difference and depending on the samples of said one of the one or more available pitch cycle, the first pitch cycle to be reconstructed as a first reconstructed pitch cycle, wherein reconstructing the reconstructed frame is conducted, such that the reconstructed frame comprises the first reconstructed pitch cycle, such that the reconstructed frame comprises a second reconstructed pitch cycle, and such that the number of samples of the first reconstructed pitch cycle differs from a number of samples of the second reconstructed pitch cycle, wherein the method further comprises generating an intermediate frame depending on said one of the one or more available pitch cycle, wherein generating the intermediate frame is conducted so that the intermediate frame comprises a first partial intermediate pitch cycle, one or more further intermediate pitch cycle, and a second partial intermediate pitch cycle, wherein the first partial intermediate pitch cycle depends on one or more of the samples of said one of the one or more available pitch cycles of the preceding frame, wherein each of the one or more further intermediate pitch cycle depends on all of the samples of said one of the one or more available pitch cycle, and wherein the second partial intermediate pitch cycle depends on one or more of the samples of said one of the one or more available pitch cycles of the preceding frame or of the succeeding frame, wherein the method further comprises determining a start portion difference number indicating how many samples are to be removed or added from the first partial intermediate pitch cycle, and wherein the method further comprises removing one or more first sample from the first partial intermediate pitch cycle, or is configured to add one or more first samples to the first partial intermediate pitch cycle depending on the start portion difference number, wherein the method further comprises determining for each of the further intermediate pitch cycles a pitch cycle difference number indicating how many samples are to be removed or added from said one of the further intermediate pitch cycles, and wherein the method further comprises removing one or more second samples from said one of the further intermediate pitch cycles, or is configured to add one or more second samples to said one of the further intermediate pitch cycles depending on said pitch cycle difference number, and wherein the method further comprises determining an end portion difference number indicating how many samples are to be removed or added from the second partial intermediate pitch cycle, and wherein the method further comprises removing one or more third sample from the second partial intermediate pitch cycle, or is configured to add one or more third sample to the second partial intermediate pitch cycle depending on the end portion difference number.

12. A non-transitory computer-readable medium comprising a computer program for implementing the method of claim 11 when being executed on a computer or signal processor.

* * * * *